United States Patent
Blessing et al.

(10) Patent No.: US 10,836,220 B2
(45) Date of Patent: Nov. 17, 2020

(54) CONTROL AND SUPPLY VALVE ASSEMBLY FOR A TIRE PRESSURE MANAGEMENT SYSTEM

(71) Applicant: DANA HEAVY VEHICLE SYSTEMS GROUP, LLC, Maumee, OH (US)

(72) Inventors: Christopher D. Blessing, Toledo, OH (US); Kurt P. Gillen, Perrysburg, OH (US); Jason M. Sidders, Perrysburg, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 380 days.

(21) Appl. No.: 15/750,671

(22) PCT Filed: Aug. 5, 2016

(86) PCT No.: PCT/US2016/045765
§ 371 (c)(1),
(2) Date: Feb. 6, 2018

(87) PCT Pub. No.: WO2017/024222
PCT Pub. Date: Feb. 9, 2017

(65) Prior Publication Data
US 2018/0236826 A1    Aug. 23, 2018

Related U.S. Application Data

(60) Provisional application No. 62/286,177, filed on Jan. 22, 2016, provisional application No. 62/201,712, filed on Aug. 6, 2015.

(51) Int. Cl.
*B60C 23/00* (2006.01)
*F16K 11/07* (2006.01)
(Continued)

(52) U.S. Cl.
CPC .. *B60C 23/00354* (2020.05); *B60C 23/00372* (2020.05); *F16K 11/0716* (2013.01);
(Continued)

(58) Field of Classification Search
CPC ............ B60C 23/003; B60C 23/00354; B60C 23/00372; F16K 11/0716; F16K 27/003; F16K 27/029; F16K 27/041
See application file for complete search history.

(56) References Cited

U.S. PATENT DOCUMENTS

| 3,456,676 | A | 7/1969 | Stuck |
| 3,489,166 | A | 1/1970 | Williams |
(Continued)

FOREIGN PATENT DOCUMENTS

| DE | 2630511 | 1/1978 |
| DE | 102008062072 | 6/2010 |
(Continued)

OTHER PUBLICATIONS

European Patent Office, International Search Report and Written Opinion issued in international application No. PCT/U2016/029156, dated Jun. 28, 2016, 10 pages.
(Continued)

*Primary Examiner* — Kip T Kotter
(74) *Attorney, Agent, or Firm* — McCoy Russell LLP

(57) ABSTRACT

A valve assembly system including a supply valve assembly, a control valve assembly and a connecting module and the tire pressure management system made therewith.

15 Claims, 13 Drawing Sheets

(51) Int. Cl.
  *F16K 27/02* (2006.01)
  *F16K 27/04* (2006.01)
  *F16K 27/00* (2006.01)

(52) U.S. Cl.
  CPC .......... *F16K 27/003* (2013.01); *F16K 27/029* (2013.01); *F16K 27/041* (2013.01)

(56) References Cited

U.S. PATENT DOCUMENTS

| | | |
|---|---|---|
| 3,724,488 A | 4/1973 | Featherstone |
| 3,747,626 A | 7/1973 | Valentino |
| 3,789,867 A | 2/1974 | Yabor |
| 4,171,119 A | 10/1979 | Lamson |
| 4,269,223 A | 5/1981 | Carter |
| 4,431,043 A | 2/1984 | Goodell |
| 4,470,506 A | 9/1984 | Goodell |
| 4,480,580 A | 11/1984 | Nalence |
| 4,641,698 A | 2/1987 | Bitonti |
| 4,678,017 A | 7/1987 | Schultz |
| 4,708,184 A | 11/1987 | Pechar |
| 4,744,399 A | 5/1988 | Magnuson |
| 4,765,385 A | 8/1988 | McGeachy |
| 4,768,574 A | 9/1988 | Probst |
| 4,782,878 A | 11/1988 | Mittal |
| 4,848,391 A | 7/1989 | Miller |
| 4,862,938 A | 9/1989 | Mittal |
| 4,895,199 A | 1/1990 | Magnuson |
| 4,905,724 A | 3/1990 | Ranalletta |
| 4,922,946 A | 5/1990 | Boulicault |
| 5,029,604 A | 7/1991 | Spektor |
| 5,141,589 A | 8/1992 | Mittal |
| 5,181,977 A | 1/1993 | Gneiding |
| 5,253,687 A | 10/1993 | Beverly |
| 5,261,471 A | 11/1993 | Freigang |
| 5,293,919 A | 3/1994 | Olney |
| 5,309,969 A | 5/1994 | Mittal |
| 5,411,051 A | 5/1995 | Olney |
| 5,413,159 A | 5/1995 | Olney |
| 5,540,268 A | 7/1996 | Mittal |
| 5,544,688 A | 8/1996 | Freigang |
| 5,587,698 A | 12/1996 | Genna |
| 5,647,927 A | 7/1997 | Mason |
| 5,713,386 A | 2/1998 | Heredia Batista |
| 5,868,155 A | 2/1999 | Hutton |
| 5,927,337 A | 7/1999 | Lamantia |
| 6,142,168 A | 11/2000 | Sumrall |
| 6,209,350 B1 | 4/2001 | Kimble |
| 6,250,327 B1 | 6/2001 | Freignang |
| 6,302,138 B1 | 10/2001 | Sumrall |
| 6,374,852 B1 | 4/2002 | Olivas |
| 6,427,714 B2 | 8/2002 | Freigang |
| 6,561,017 B1 | 5/2003 | Claussen |
| 6,604,414 B1 | 8/2003 | Claussen |
| 6,634,375 B2 | 10/2003 | Olivas |
| 6,758,088 B2 | 7/2004 | Claussen |
| 6,865,930 B1 | 3/2005 | Claussen |
| 6,880,598 B2 | 4/2005 | Haunhorst |
| 6,943,673 B2 | 9/2005 | Skoff |
| 7,032,611 B1 | 4/2006 | Sheng |
| 7,051,585 B2 | 5/2006 | Claussen |
| 7,079,047 B2 | 7/2006 | Boulot |
| 7,188,638 B1 | 3/2007 | Peach |
| 7,191,796 B1 | 3/2007 | Rehmert, Jr. |
| 7,261,121 B2 | 8/2007 | Bordonaro |
| 7,434,455 B2 | 10/2008 | Alff |
| 7,437,920 B2 | 10/2008 | Beverly |
| 7,686,051 B2 | 3/2010 | Medley |
| RE41,756 E | 6/2010 | Claussen |
| 7,857,173 B2 | 12/2010 | Bolyard, Jr. |
| 8,113,234 B2 | 2/2012 | Campau |
| 8,136,561 B2 | 3/2012 | Sandoni |
| 8,256,447 B2 | 9/2012 | Badstue |
| 8,307,868 B2 | 11/2012 | Medley |
| 8,307,869 B2 | 11/2012 | Medley |
| 8,356,620 B2 | 1/2013 | Colussi |
| 8,596,560 B2 | 12/2013 | Morgan |
| 8,844,596 B2 | 9/2014 | Medley |
| 9,278,587 B2 | 3/2016 | Honig |
| 9,296,264 B2 | 3/2016 | Mozingo |
| 9,308,788 B2 | 4/2016 | Fazekas |
| 9,493,042 B2 | 11/2016 | Gillen |
| 9,573,428 B2 | 2/2017 | Sidders |
| 10,214,059 B2 | 2/2019 | Gillen |
| 2002/0134428 A1 | 9/2002 | Gabelmann |
| 2006/0225798 A1 | 10/2006 | Bordonaro |
| 2006/0283509 A1* | 12/2006 | Narita ................ F15B 13/0896 137/596.16 |
| 2008/0223457 A1 | 9/2008 | Kobziar |
| 2009/0032619 A1 | 2/2009 | Morgan |
| 2010/0147387 A1* | 6/2010 | Medley ................ F16K 15/207 137/1 |
| 2011/0089361 A1* | 4/2011 | Renninger ........... F16K 27/003 251/367 |
| 2011/0175716 A1* | 7/2011 | Medley ................ B60C 23/002 340/442 |
| 2011/0221261 A1 | 9/2011 | Eaton |
| 2011/0272618 A1 | 11/2011 | Mosler |
| 2011/0308637 A1 | 12/2011 | Tsiberidis |
| 2011/0315235 A1 | 12/2011 | Colefax |
| 2012/0059546 A1 | 3/2012 | Wilson |
| 2012/0138826 A1 | 6/2012 | Morris |
| 2014/0224399 A1 | 8/2014 | Mozingo |
| 2015/0020931 A1 | 1/2015 | Kawamura |
| 2018/0229558 A1 | 8/2018 | Blessing |
| 2018/0236826 A1 | 8/2018 | Blessing |

FOREIGN PATENT DOCUMENTS

| | | |
|---|---|---|
| EP | 0164916 | 12/1985 |
| EP | 0206949 A1 | 12/1986 |
| EP | 2522532 | 11/2012 |
| FR | 1432885 | 3/1966 |
| FR | 2149276 | 3/1973 |
| FR | 2619762 | 3/1989 |
| GB | 410531 | 5/1934 |
| GB | 646891 | 11/1950 |
| GB | 1037494 | 7/1966 |
| GB | 1346130 | 2/1974 |
| GB | 2262921 A | 7/1993 |
| GB | 2312268 | 10/1997 |
| GB | 2348268 | 9/2000 |
| WO | 9114120 | 9/1991 |
| WO | 2002062595 | 8/2002 |
| WO | 2004030952 | 4/2004 |
| WO | 2010094067 | 8/2010 |
| WO | 2011028346 | 3/2011 |
| WO | 2014028142 | 2/2014 |
| WO | 2014151418 A1 | 9/2014 |

OTHER PUBLICATIONS

European Patent Office, International Search Report and Written Opinion issued in international application No. PCT/U2016/045765, dated Nov. 4, 2016, 12 pages.

European Patent Office, International Search Report and Written Opinion issued in international application No. PCT/U2016/045744, dated Oct. 28, 2016, 14 pages.

Office Action dated Jun. 6, 2019 for U.S. Appl. No. 15/568,613 (pp. 1-10).

Office Action dated Jul. 11, 2018 for U.S. Appl. No. 15/289,414 (pp. 1-8).

* cited by examiner

CONTROL AND SUPPLY VALVE ASSEMBLY FOR A TIRE PRESSURE MANAGEMENT SYSTEM

CROSS-REFERENCE TO RELATED APPLICATIONS

This application claims the benefit of U.S. Provisional Application No. 62/201,712 filed on Aug. 6, 2015 and U.S. Provisional Application No. 62/286,177 filed on Jan. 22, 2016, which are herein incorporated by reference.

FIELD OF INVENTION

The present invention relates to a valve assembly system. More particularly, the invention relates to a valve assembly system including a supply valve assembly, a control valve assembly and a connecting module and the tire pressure management system made therewith.

BACKGROUND OF THE INVENTION

Certain types of vehicles such as, for example, commercial vehicles require that the tire pressure of their wheel assemblies be periodically adjusted for optimal performance. Tire pressure management systems can be utilized to manually and/or automatically adjust the pressure within one or more wheel assemblies. Typically, tire pressure management systems include a control unit. Such control units house valving and other plumbing utilized to direct pressurized air through the system. Unfortunately, the valving and plumbing known in the prior art systems is complex and expensive.

Therefore, it would be advantageous to develop a valve assembly system that was less expensive and required less space than the known assemblies. A tire pressure management system utilizing the valve assembly system would also be desirable and have certain advantages over the known systems.

SUMMARY OF THE INVENTION

A valve assembly system for a tire pressure management system including a supply valve assembly, a control valve assembly and a connecting module. The supply valve assembly includes a supply valve housing having a front outer surface, a rear outer surface, two side outer surfaces, a first opening, a first port, a second port, a third port, and a valve cavity. The first port and second port are parallel to each other and perpendicular to the first opening and third port and the third port is perpendicular to the first opening. At least one of the front outer surface, rear outer surface and two side outer surfaces has a structural support element extending therefrom. A solenoid valve is disposed within the valve cavity and the valve cavity is in fluid communication a source of pressurized air through the third port and a fluid conduit through the second port.

The control valve assembly includes a control valve housing having a front outer surface, a rear outer surface, two side outer surfaces, a first opening, a first port, a second port and a valve cavity. The first port and second port are parallel to each other and perpendicular to the first opening. At least one of the front outer surface, rear outer surface and two side outer surfaces has a structural support element extending therefrom. A solenoid valve is disposed within the valve cavity and the valve cavity is in selective fluid communication between a source of pressurized air through the fluid conduit.

The connecting module includes a first port and a second port in fluid communication with each other. The first port connects to the first port of the supply valve assembly and the second port connects to the second port of the control valve assembly. The supply valve assembly is in fluid communication with the control valve assembly via the connecting module extending therebetween.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
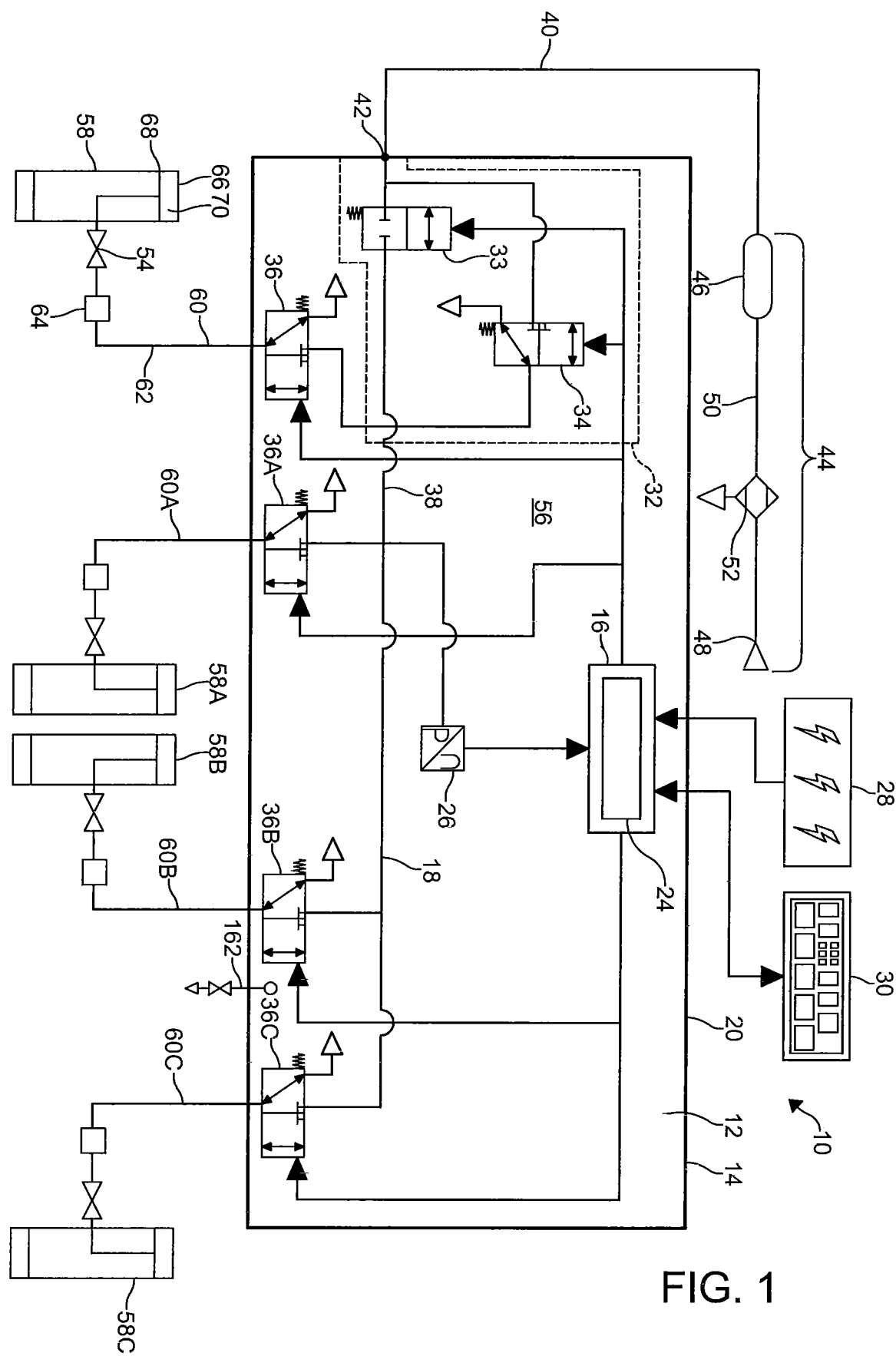
FIG. 1 is a schematic view of an embodiment of a tire pressure management system in accordance with the invention.

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Figure 8:
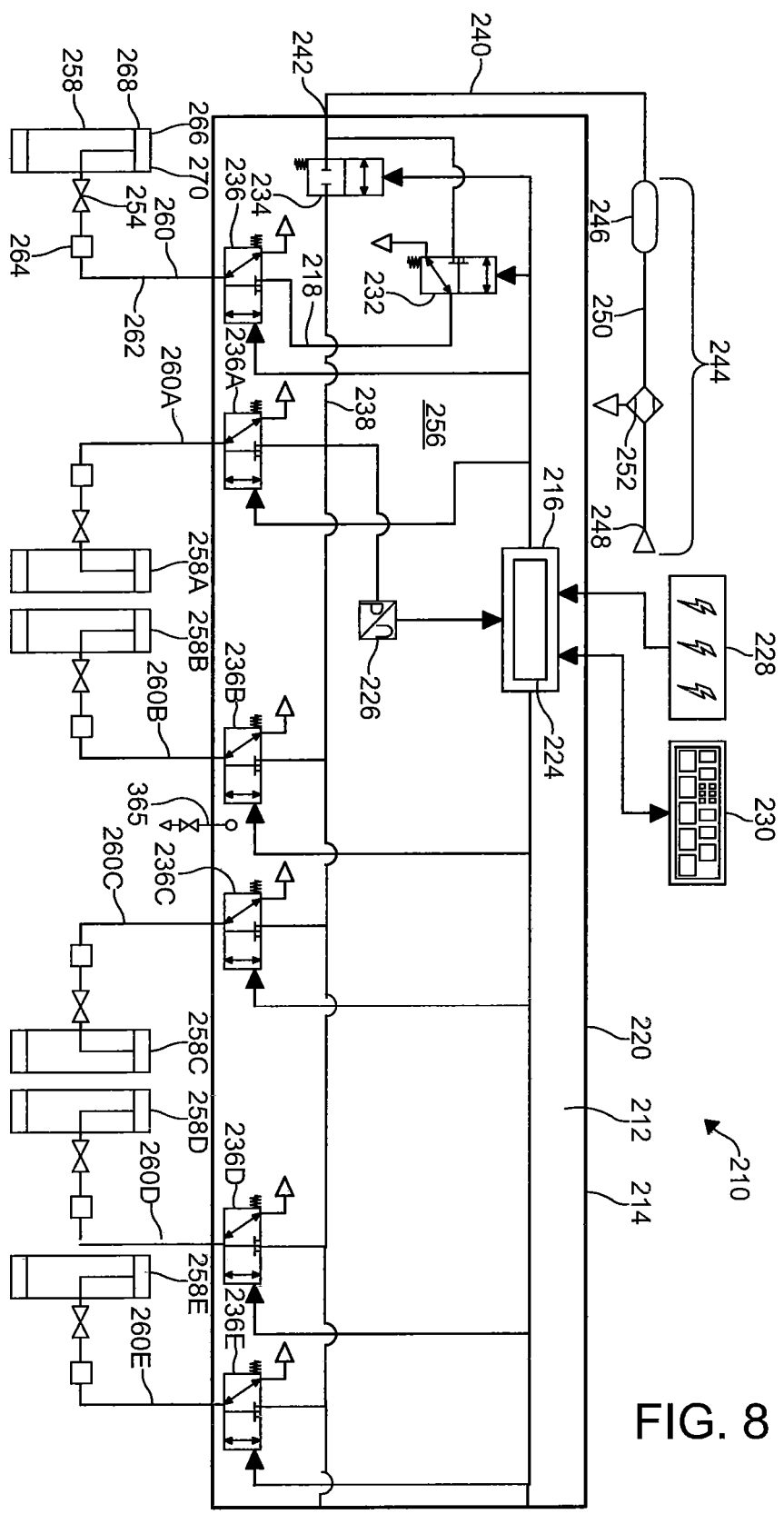
FIG. 8 is a schematic view of a preferred embodiment of a tire pressure management system in accordance with the invention.

A valve assembly system and the tire pressure management system made therewith will be described below. Embodiments of the tire pressure management system 10, 210 are illustrated in FIGS. 1 and 8. The tire pressure management system 10, 210 is provided on a vehicle (not depicted). A preferred type of vehicle is a commercial vehicle. Commercial vehicles are known in the art. However, the tire pressure management system 10, 210 may also have applications in vehicles for both light and heavy duty and for passenger and off-highway vehicles. Furthermore, it would be understood by one of ordinary skill in the art that the tire pressure management system 10, 210 could have industrial, locomotive, military and aerospace applications.

In certain embodiments, the tire pressure management system 10, 210 may operate as described in published PCT patent application no. WO 2014/151418, the entire disclosure of which is hereby incorporated by reference. The tire pressure management system 10, 210 is configured to adjust tire pressure. Preferably, the tire pressure management system 10, 210 can increase the tire pressure. However, the tire pressure management system 10, 210 may also be utilized to increase and decrease tire pressure. The tire pressure management system 10, 210 will be described in connection with a fluid. For the purposes of describing the tire pressure management system 10, 210, the fluid will hereinafter be referred to as air. However, alternative fluids are capable of being utilized.

The tire pressure management system 10, 210 includes a control unit 12, 212. The control unit 12, 212 is configured to enable measuring the tire pressure of one or more wheel assemblies and, if needed, increasing or decreasing the tire pressure thereof. The control unit 12, 212 is also configured to enable venting of one or more portions of the tire pressure management system 10, 210.

Referring now to FIGS. 1 and 8, the control unit 12, 212 includes a control unit housing 14, 214. An electronic control portion 16, 216 and a pneumatic control portion 18, 218 are provided within the control unit housing 14, 214. The electronic control portion 16, 216 and the pneumatic control portion 18, 218 communicate to direct pressurized air through the tire pressure management system 10, 210.

The electronic control portion 16, 216 may include a microprocessor 24, 224 operating under the control of a set of programming instructions, which may also be referred to as software. The electronic control portion 16, 216 may include a memory (not depicted) in which programming instructions are stored. The memory can also store identification codes, tire pressure records and/or user inputs over a period of time.

The electronic control portion 16, 216 may receive input signals from a pressure sensor 26, 226, power supply 28, 228 and one or more additional sensors (not depicted) such as, for example, a load sensor and a speed sensor. The load sensor and speed sensor may each be conventional in the art. The pressure sensor 26, 226 may also be referred to as a pressure transducer and will be discussed in greater detail below. The electronic control portion 16, 216 may also receive input signals from an operator control device 30, 230.

The operator control device 30, 230 may allow an operator of the vehicle to exert a certain level of control over the tire pressure management system 10, 210. The operator control device 30, 230 may be conventional in the art. The operator control device 30, 230 permits an operator of the vehicle to transmit control signals to the electronic control portion 16, 216 to adjust the tire pressure.

The electronic control portion 16, 216 outputs signals to one or more members of the pneumatic control portion 18, 218. Preferably, the electronic control portion 16, 216 outputs signals to a plurality of valve assemblies 32, 36, 36A, 36B, 36C, 232, 234, 236, 236A, 236B, 236C, 236D, 236E of the pneumatic control portion 18, 218. The output signals may be electrical current. Electrical current can be received by a valve assembly 32, 36, 36A, 36B, 36C, 232, 234, 236, 236A, 236B, 236C, 236D, 236E to place the assembly in an open position or a closed position. Similarly, electrical current can be removed from the valve assembly 32, 36, 36A, 36B, 36C, 232, 234, 236, 236A, 236B, 236C, 236D, 236E to place the assembly in an open position or a closed position. The electronic control portion 16, 216 may also output signals to a display device (not depicted). The display device may be included as a part of the operator control device 30, 230 or a freestanding device.

The pneumatic control portion 18, 218 includes a first fluid conduit 38, 238 provided within the control unit housing 14, 214. On a side, an air supply port 42, 242 is in provided in the control unit housing 14, 214 and is in fluid communication with an air supply circuit 40, 240. The tire pressure management system 10, 210 includes a source of pressurized air 44, 244. Pressurized air is supplied to control unit 12, 212 from the source of pressurized air 44, 244 via the air supply circuit 40, 240. Preferably, the source of pressurized air 44, 244 includes a reservoir 46, 246 such as, for example, a wet tank. Preferably, a compressor 48, 248 is attached to the vehicle and in fluid communication with the wet tank 46, 246 via a supply conduit 50, 250. The air compressor 48, 248 supplies pressurized air to the wet tank 46, 246 for storage therein. In certain embodiments, a drier 52, 252 is interposed in the air supply circuit 40, 240 for removing water from the air. A filter (not depicted) may also be interposed in the air supply circuit 40, 240.

The pressurized air is utilized to measure the tire pressure and, if needed, open one or more wheel valves 54, 254 and increase the tire pressure. The pressurized air provided in the air supply circuit 40, 240 and supplied from the source of pressurized air 44, 244 includes air at a certain pressure. The pressure sensor 26, 226 measures the pressure of the pressurized air provided in the air supply circuit 40, 240. It is preferred that at the time the method is practiced that the pressurized air provided in the air supply circuit 40, 240 is at a pressure which is greater than the tire pressure. Preferably, the pressure of the pressurized air provided in the air supply circuit 40, 240 is equal to or greater than the target tire pressure so that the tire pressure can, if needed, be increased to the target tire pressure. In an embodiment, the pressure of the air provided in the air supply circuit 40, 240 is equal to the target tire pressure plus 5 psig or more.

The pressure sensor 26, 226 is provided within the control unit housing 14, 214 and is in fluid communication with the first fluid conduit 38, 238. The pressure sensor 26, 226 measures the pressure of the air within the first fluid conduit 38, 238. Thus, when the source of pressurized air 44, 244 is in fluid communication with the first fluid conduit 38, 238, the pressure sensor 26, 226 can measure the pressure of the air from the source of pressurized air 44, 244 by measuring the pressure of the air in the first fluid conduit 38, 238. Also, during certain operations, the pressure sensor 26, 226 may measure the pressure of the air in a fluid control circuit 60, 60A, 60B, 60C, 260, 260A, 260B, 264C, 260D, 260E by measuring the pressure of the air in the first fluid conduit 38, 238. Once the pressure of the air in the first fluid conduit 38, 238 has been measured, the pressure sensor 26, 226 can send a signal to the electronic control portion 16, 216.

Referring now to FIG. 1, in one embodiment the first fluid conduit 38 is in fluid communication with the pressure sensor 26, a valve assembly 32 which is a control and supply valve assembly. Also, the first fluid conduit 38 is selectively in fluid communication with a chamber 56. The first fluid conduit 38 is also attached to and in fluid communication with one or more channel valve assemblies 36, 36A, 36B, 36C.

Preferably, a channel valve assembly 36, 36A, 36B, 36C is provided for each wheel assembly 58, 58A, 58B, 58C and each is attached to and in fluid communication with the first fluid conduit 38. Preferably, each channel valve assembly 36, 36A, 36B, 36C enables fluid communication between the first fluid conduit 38 and a fluid control circuit 60, 60A, 60B, 60C. Preferably, the channel valve assemblies 36, 36A, 36B, 36C are similarly configured. Thus, for describing the features of the channel valve assemblies 36, 36A, 36B, 36C, only one channel valve assembly 36 will be referred to below.

Also, it is preferred that each fluid control circuit 60, 60A, 60B, 60C is similarly configured. Thus, for describing the features of the fluid control circuits 60, 60A, 60B, 60C, only one fluid control circuit 60 will be referred to below. Preferably, the fluid control circuit 60 includes one or more fluid conduits 62, a rotary joint assembly 64 and/or a hose assembly (not depicted).

Further, it is preferred that each wheel assembly 58, 58A, 58B, 58C is similarly configured. Thus, for describing the features of the wheel assembly 58, 58A, 58B, 58C, only one wheel assembly 58 will be referred to below. The wheel assembly 58 includes a tire 66 and a wheel rim 68. An axle may be coupled to the wheel rim 68. A space 70 between the tire 66 and the wheel rim 68 is configured to house pressurized air.

The pressurized air housed within the space 70 is referred to herein as "tire pressure." Tire pressure is increased by the addition of pressurized air into the space 70 and decreased by the removal of air from the space 70. Preferably, the tire pressure is equal to a target tire pressure. The target tire pressure can be selected by an operator of the vehicle to be a desired pressure. After the target tire pressure is selected, it can be programmed into the control unit 12 via the electronic control portion 16. The target tire pressure can also be pre-programmed into the control unit 12. To ascertain if the tire pressure is equal to the target tire pressure, the tire pressure is measured. As noted above, the control unit 12 is configured to enable measuring the tire pressure.

Preferably, the wheel valve 54 is attached to the wheel assembly 58. The wheel valve 54 separates the fluid control circuit 60 from the wheel assembly 58 and is utilized to retain pressurized air therein. Also, the wheel valve 54 allows the wheel assembly 58 to selectively communicate with the control unit 12 via the fluid control circuit 60. The wheel valve 54 may be of the check valve variety.

When the channel valve assembly 36 is in the open position, the first fluid conduit 38 is in fluid communication with the fluid control circuit 60. The fluid control circuit 60 is capable of fluid communication with the wheel assembly 58 via the wheel valve 54. When the first fluid conduit 38 is in fluid communication with the fluid control circuit 60, a flow of air from the source of pressurized air 44 can be directed to the wheel assembly 58 via the control and supply valve assembly 32, the channel valve assembly 36, the fluid control circuit 60, and the wheel valve 54. Thus, the channel valve assembly 36 is utilized to promote airflow from the source of pressurized air 44 to the wheel assembly 58.

The control and supply valve assembly 32 is provided within the control unit housing 14 and the air supply port 42 is provided as a portion of the control and supply valve assembly 32. The control and supply valve assembly 32 is in fluid communication with the first fluid conduit 38 and the air supply circuit 40. In certain embodiments, the control and supply valve assembly 32 is utilized to communicate a first flow or bleed of pressurized air to the first fluid conduit 38 and to communicate a second flow of pressurized air to the first fluid conduit 38. The flowrate of the second flow of pressurized air is greater than the flowrate of the first flow of pressurized air. In other embodiments, the control and supply valve assembly 32 is utilized to vent the first fluid conduit 38. In still further embodiments, the control and supply valve assembly 32 is utilized as a throttle for decreasing the tire pressure.

Figure 4:
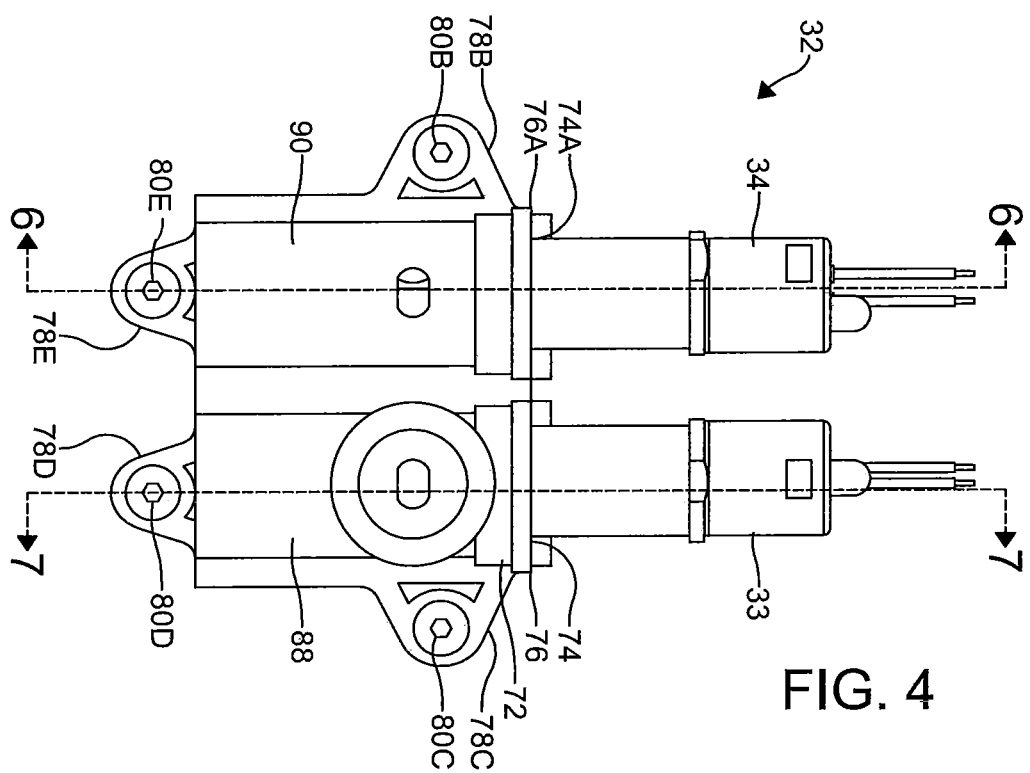
FIG. 4 is a front view of the control and supply valve assembly of FIG. 3.
Figure 5:
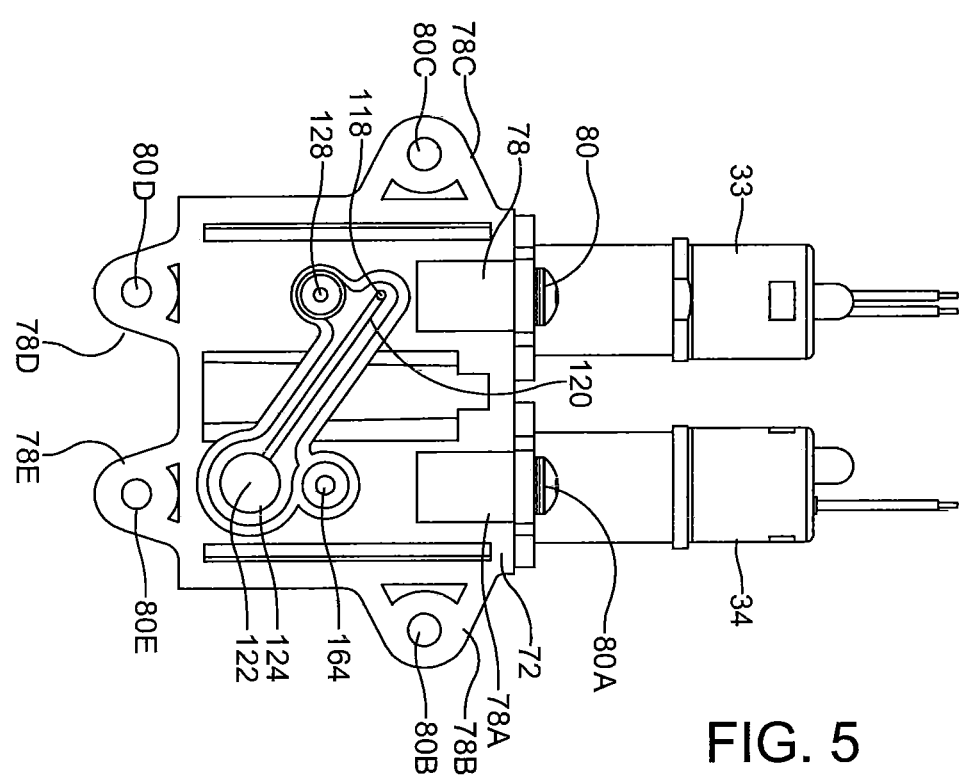
FIG. 5 is a rear view of the control and supply valve assembly of FIG. 3.

Referring now to FIGS. 4-5, the control and supply valve assembly 32 includes a first solenoid valve 33 and a second solenoid valve 34. Also, the control and supply valve assembly 32 includes a valve housing 72. Each solenoid valve 33, 34 is fitted within an opening 74, 74A located in an upper portion 76, 76A of the valve housing 72. Preferably, the valve housing 72 is formed in a unitary manner. More preferably, the valve housing 72 is formed with a rigid polymeric material and from an injection molding process.

Figure 6:
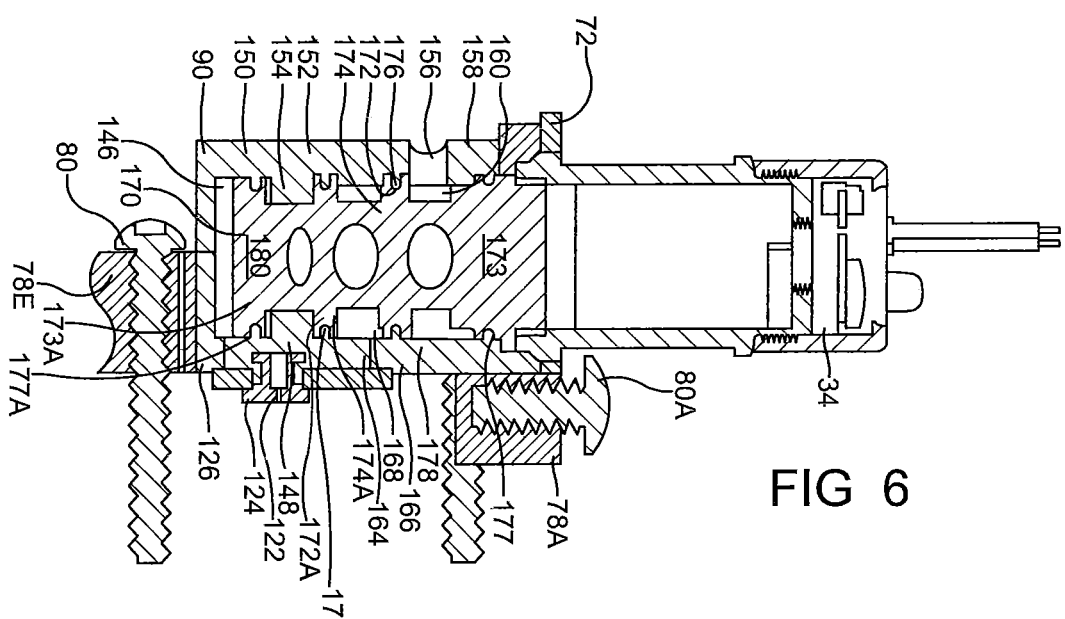
FIG. 6 is a cross-sectional view through a portion of the control and supply valve assembly of FIG. 4 along line 6-6.

The valve housing 72 includes a plurality of attaching portions 78, 78A, 78B, 78C, 78D, 78E. The first attaching portion 78 is utilized to secure the first solenoid valve 33 to the valve housing 72. The first solenoid valve 33 is secured to the valve housing 72 by inserting a fastener 80 through the first attaching portion 78. The second attaching portion 78A is utilized to secure the second solenoid valve 34 to the valve housing 72. The second solenoid valve 34 is secured to the valve housing 72 by inserting a fastener 80A through the second attaching portion 78A, as shown in FIG. 6. The third attaching portion 78C, the fourth attaching portion 78D, and the fifth attaching portion 78E are utilized to secure the valve housing 74 to the control unit housing 14. The valve housing 74 is secured to the control unit housing 14 by inserting a fastener 80C, 80D, 80E through each of the third, fourth, and fifth attaching portions 78C, 78D, 78E. As shown best in FIG. 2, the valve housing 72 is engaged with a cover member 82 of the control unit 12. More particularly, an air supply port portion 84 of the valve housing 72 extends through an opening 86 in the cover member 82.

Referring now to FIGS. 4-5, the control and supply valve assembly 32 includes a first portion 88 and a second portion 90. The first portion 88 includes the first solenoid valve 33 and the second portion 90 includes the second solenoid valve 34. As noted above, the control and supply valve assembly 32 may receive a signal from the electronic control portion 16. More particularly and in certain embodiments, the control and supply valve assembly 32 may receive one or more signals from the electronic control portion 16. In these embodiments, the control and supply valve assembly 32 may receive two signals from the electronic control portion 16. For example, separate signals from the electronic control portion 16 are received by the first solenoid valve 33 and the second solenoid valve 34. Also, as noted above, the signals received by the first solenoid valve 33 and the second solenoid valve 34 may be an electrical current. Similarly, in certain embodiments, one or both of the signals can be removed from the control and supply valve assembly 32.

For describing the tire pressure management system 10 provided herein, when an electrical current is received by the first solenoid valve 33 or the second solenoid valve 34, the solenoid valves 33, 34 receiving the current may be referred to as being "energized." When no electrical current is received by the first solenoid valve 33 or the second solenoid valve 34 or when electrical current is removed from the first solenoid valve 33 or the second solenoid valve 34, the solenoid valves 33, 34 may be referred to as being "de-energized." Preferably, each solenoid valve 33, 34 is normally de-energized.

When the first solenoid valve 33 is energized, the air supply circuit 40 is in fluid communication with the first fluid conduit 38 via the first portion 88 of the control and supply valve assembly 32. When the air supply circuit 40 is in fluid communication with the first fluid conduit 38 via the first portion 88 of the control and supply valve assembly 32, the second flow of pressurized air can be communicated to the first fluid conduit 38. When the first solenoid valve 33 is de-energized, the air supply circuit 40 is not in fluid communication with the first fluid conduit 38 via the first portion 88.

When the second solenoid valve 34 is energized, the air supply circuit 40 is in fluid communication with the first fluid conduit 38 via the second portion 90 of the control and supply valve assembly 32. When the air supply circuit 40 is in fluid communication with the first fluid conduit 38 via the second portion 90 of the control and supply valve assembly 32, the first flow of pressurized air can be communicated to the first fluid conduit 38. When the first solenoid valve 33 is de-energized, the air supply circuit 40 is not in fluid communication with the first fluid conduit 38 via the second portion 90 and the first fluid conduit 38 is in fluid communication with the chamber 56. When the first fluid conduit 38 is in fluid communication with the chamber 56 and if pressurized air is within the first fluid conduit 38, the first fluid conduit 38 and any other portions of the tire pressure management system 10 in fluid communication with the first fluid conduit 38, are vented. The first fluid conduit 38 is vented by directing a flow of pressurized air from the first fluid conduit 38 through the second portion 90 of the control and supply valve assembly 32 into the chamber 56.

When the first solenoid valve 33 and the second solenoid valve 34 are both energized, the air supply circuit 40 is in fluid communication with the first fluid conduit 38 via the first portion 88 and the second portion 90 of the control and supply valve assembly 32. When the air supply circuit 40 is in fluid communication with the first fluid conduit 38 via the first portion 88 and the second portion 90 of the control and supply valve assembly 32, pressurized air from the air supply circuit 40 can be measured or can be directed to the fluid control circuit 60 via the first fluid conduit 38 to determine, increase, and/or decrease the tire pressure. Determining, increasing, and/or decreasing the tire pressure is achieved by directing pressurized air from the first fluid conduit 38 to the fluid control circuit 60.

Figure 2:
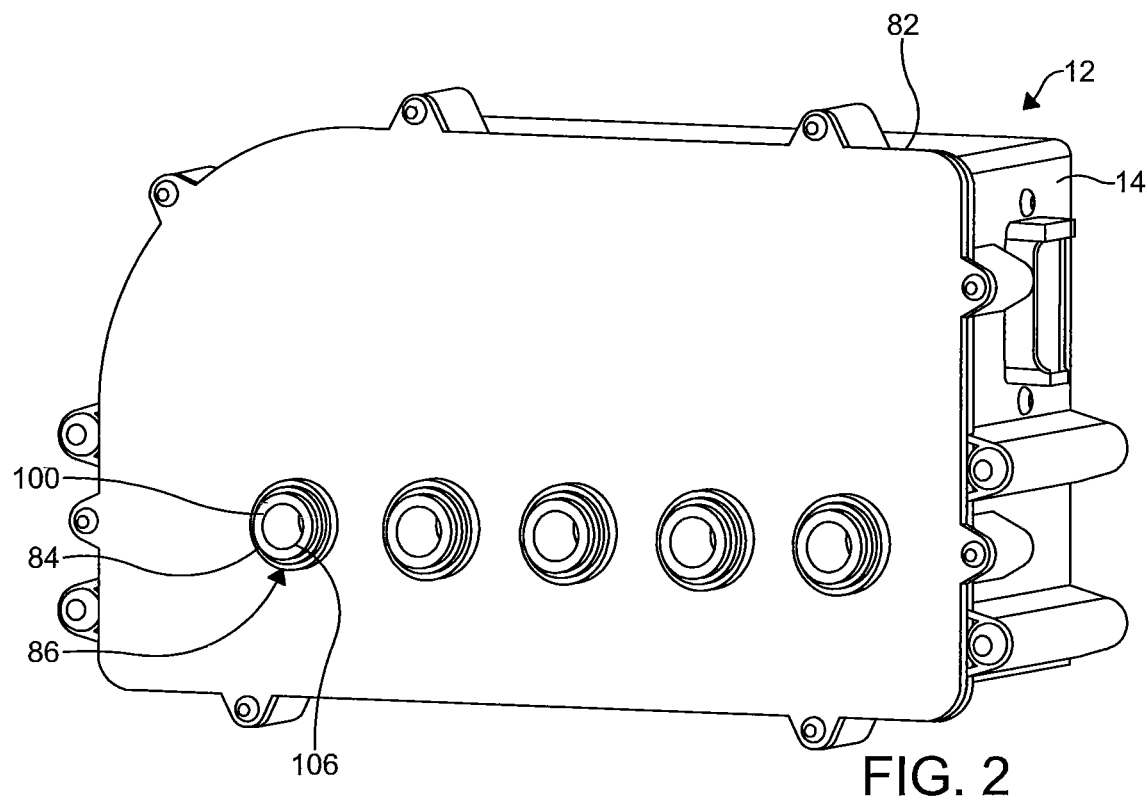
FIG. 2 is an isometric view of an embodiment of a control unit of the tire pressure management system of FIG. 1.
Figure 3:
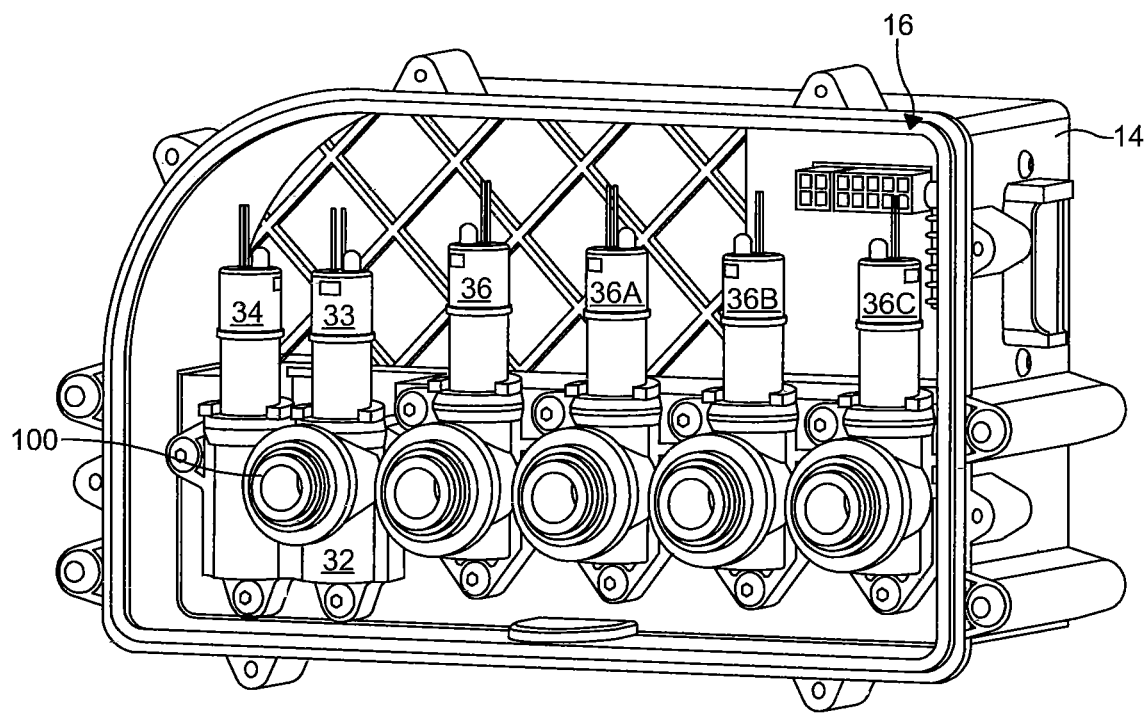
FIG. 3 is an isometric view of the control unit of FIG. 2 with a cover member removed depicting the orientation of an embodiment of a valve assembly system in accordance with the invention.
Figure 7:
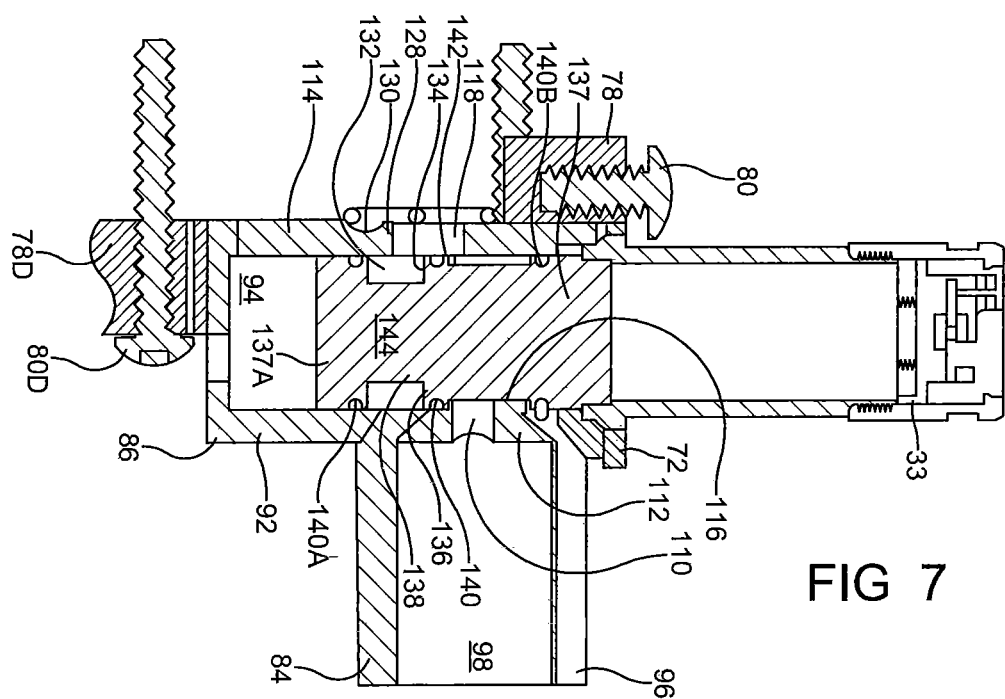
FIG. 7 is a cross-sectional view through another portion of the control and supply valve assembly of FIG. 4 along line 7-7.

The air supply port portion 84 is in fluid communication with a first valve cavity 94 as shown in in FIGS. 6 and 7. Referring now to FIG. 2, the air supply port portion 84 is in a sealed relationship with a cover member 82 of the control unit housing 14. Referring now to FIG. 7, the air supply port portion 84 includes a cylindrical-shaped wall member 96 which defines a cavity 98. The cavity 98 may receive a portion of the air supply circuit 40 such that the air supply circuit 40 and the air supply port portion 84 are in a sealed relationship. In this embodiment, the cylindrical-shaped wall member 96 and the portion of the air supply circuit 40 received by the cavity 98 may be attached to each other.

In another embodiment, as illustrated in FIG. 2, a supply port insert 100 is provided in the cavity 98 to receive a portion of the air supply circuit 40 to enable the air supply circuit 40 and the air supply port portion 84 to be in a sealed relationship. In these embodiments, the supply port insert 100 is a generally cylindrical-shaped member. The supply port insert 100 includes a retainer portion (not depicted) and an outer opening 106. In this embodiment, the valve housing 72 is attached to the air supply circuit 40 by inserting a portion of the air supply circuit 40 through the outer opening 106 and by engagement of the retaining member with the portion of the air supply circuit 40 inserted therein. The supply port insert 100 also includes a sealing member (not depicted). The sealing member is provided around the portion of the air supply circuit 40 inserted into the supply port insert 100 to provide a seal between the air supply circuit 40 and the air supply port portion 84 of the valve housing 72. Preferably, the sealing member is an O-ring.

Referring now to FIG. 7, the valve housing 72 includes a first portion 92 which includes the first valve cavity 94. The first valve cavity 94 and the cavity 98 in the air supply port portion 84 are in fluid communication via a first fluid opening 110. The first fluid opening 110 is provided in a middle portion 112 of a first wall portion 114 of the valve housing 72. The first wall portion 114 partially defines the air supply port portion 84 and the first valve cavity 94. The cylindrical-shaped wall member 96 and the first wall portion 114 are attached to each other in a perpendicular relationship such that the wall member 96 extends from the first wall portion 114 toward and through the cover member 82 as shown in FIG. 2.

Referring back to FIGS. 1-7, the first fluid opening 110 enables fluid communication between the first valve cavity 94 and the air supply circuit 40 via the air supply port portion 84. More particularly, on a side, first fluid opening 110 is in fluid communication with the air supply circuit 40 via the cavity 98 in the air supply port portion 84. On an opposite side, the first fluid opening 110 is in fluid communication with an upper chamber portion 116 provided in the first valve cavity 94. Thus, the air supply port portion 84 is in fluid communication with the upper chamber portion 116 via the first fluid opening 110.

The first portion 88 and the second portion 90 of the control and supply valve assembly 32 are in fluid communication via a second fluid opening 118 and an air passageway 120 which extends therebetween as depicted in FIG. 5. The first fluid opening 110 and second fluid opening 118 are in continuous fluid communication. The first fluid opening 110 is of a size which is larger than or equal to a size of the second fluid opening 118. The first fluid opening 110 and the second fluid opening 118 are aligned. The second fluid opening 118 is provided in the middle portion 112 of the first wall portion 114 below the first upper attaching portion 78. On a side, the second fluid opening 118 is in fluid communication with the upper chamber portion 116 provided in the first valve cavity 94. On an opposite side, the second fluid opening 118 is in fluid communication with the air passageway 120 that extends between the first portion 88 and the second portion 90 of the control and supply valve assembly 32.

The air passageway 120 that extends between the first portion 88 and the second portion 90 of the control and supply valve assembly 32 is in fluid communication with the second fluid opening 118 and an orifice 122 provided in the second portion 90. The orifice 122 is sized to communicate the first flow of pressurized air to the first fluid conduit 38 and/or the fluid control circuit 60 when the second solenoid valve 34 is energized. Referring now to FIGS. 5-6, the orifice 122 is defined by an orifice insert 124 attached to a second portion 126 of the valve housing 72. The orifice insert is a hollow member of a generally cylindrical shape.

Referring back to FIG. 7, the first portion 88 of the control and supply valve assembly 32 is selectively in fluid communication with the first fluid conduit 38 via a third fluid opening 128. The first fluid opening 110 and third fluid opening 128 are in a parallel relationship with each other and are selectively in fluid communication. The third fluid opening 128 is provided in a lower portion 130 of the first wall portion 114 below the second fluid opening 118.

The third fluid opening 128 enables fluid communication between the fluid control circuit 60 and the source of pressurized air 44 via the first fluid conduit 38. More particularly, on a side, the third fluid opening 128 is in fluid communication with a lower chamber portion 132 provided in the first valve cavity 94. On an opposite side, the third fluid opening 128 is in fluid communication with a portion of the first fluid conduit 38 formed in a hollow adapter (not depicted).

As illustrated in FIG. 7, the first valve cavity 94 is of a generally cylindrical shape. A first valve cavity insert 134 is disposed within the first valve cavity 94. In certain embodiments, the first valve cavity insert 134 prevents the transfer of pressurized air through the first valve cavity 94 from the air supply port portion 84. In other embodiments, the first valve cavity insert 134 helps to direct the transfer of pressurized air through the first valve cavity 94 from the air supply port portion 84.

The first valve cavity insert 134 is in a sealed relationship with the valve housing 72 and partially defines the upper chamber portion 116 and the lower chamber portion 132. The first valve cavity insert 134 includes an annular portion 136 and two cylindrical portions 137, 137A. The annular portion 136 may be attached to each cylindrical portion 137, 137A by a wall portion. A aperture 138 is provided through the annular portion 136 to facilitate the movement of pressurized air through the first valve cavity 94.

A sealing member 140, 140A, 140B is provided around the annular portion 136 and each cylindrical portion 137, 137A. Preferably, each sealing member 140, 140A, 140B is disposed in a groove and is ring-shaped. Preferably, the sealing member 140, 140A, 140B is formed from an elastomeric material. In an embodiment, each sealing member 140, 140A, 140B is an O-ring. Each sealing member 140, 140A, 140B provides a seal between the annular portion 136 or one of the cylindrical portions 137, 137A and an inner surface 142 of the first wall portion 114 which allows the first valve cavity insert 134 to be in a sealed relationship with the valve housing 72.

As noted above, the first portion 88 of the control and supply valve assembly 32 includes the upper chamber portion 116 and the lower chamber portion 132. The upper chamber portion 116 is in fluid communication with the air passageway 120 that extends between the first portion 88 and the second portion 90 of the control and supply valve assembly 32 as depicted in FIG. 5. The upper chamber portion 116 is also selectively in fluid communication with the lower chamber portion 132 as shown in FIG. 7. The upper chamber portion 116 is in fluid communication with the lower chamber portion 132 when, for example, it is desired to determine, increase, and/or decrease the tire pressure. As noted above, the lower chamber portion 132 is in fluid communication with the first fluid conduit 38 via the third fluid opening 128.

The first portion 88 of the control and supply valve assembly 32 includes a first biasing member (not depicted). The first biasing member is attached to a first poppet 144. The first poppet 144 is moveable in response to the first biasing member. The first poppet 144 seals against the annular portion 136 of the first valve cavity insert 134. The first biasing member moves the first poppet 144 when the first solenoid valve 33 is energized or de-energized. In an embodiment, when a signal from the electronic control portion 16 is received by the first solenoid valve 33, the first biasing member urges the first poppet 144 toward the lower chamber portion 132. In another embodiment, when a signal from the electronic control portion 16 is not received by the first solenoid valve 33, the first biasing member urges the first poppet 144 toward the upper chamber portion 116.

When the first biasing member urges the first poppet 144 toward the upper chamber portion 116, the first poppet 144 seals against the annular portion 136 of the first valve cavity insert 134. When the first poppet 144 seals against the first valve cavity insert 134, the lower chamber portion 132 is not in fluid communication with the air supply circuit 40. When the first biasing member urges the first poppet 144 toward the lower chamber portion 132, the first poppet 144 is no longer in a sealed relationship the annular portion 136 of the first valve cavity insert 134. When the first poppet 144 is not in a sealed relationship with the first valve cavity insert 134, the upper chamber portion 116 is in fluid communication with the lower chamber portion 132. As noted above, the upper chamber portion 116 is in fluid communication with the lower chamber portion 132 to allow the fluid control circuit 60 to be to determine, increase, and/or decrease the tire pressure.

Referring now to FIGS. 4-6, the orifice 122 is also in fluid communication with the second portion 90 of the control and supply valve assembly 32. More particularly, the second portion 90 of the control and supply valve assembly 32 includes the second portion 126 of the valve housing 72 and the orifice 122 is in fluid communication with the second portion 126 of the valve housing 72. The second portion 126 of the valve housing 72 includes a second valve cavity 146. The orifice 122 and the second valve cavity 146 are in fluid communication via a first fluid opening 148. The first fluid opening 148 is provided in a lower portion 150 of a second wall portion 152 of the valve housing 72. The second wall portion 152 partially defines the second valve cavity 146.

The first fluid opening 148 enables fluid communication between the second valve cavity 146 and the orifice 122 and the other portions of the tire pressure management system 10 in fluid communication with the orifice 122. More particularly, on a side, the first fluid opening 148 is in fluid communication with a lower chamber portion 154 provided in the second valve cavity 146. On an opposite side, the first fluid opening 148 is in fluid communication with the orifice 122 provided through the orifice insert 124. The first fluid opening 148 is provided below the second upper attaching portion 78A.

The control and supply valve assembly 32 is also in fluid communication with the atmosphere via a second fluid opening 156. The first fluid opening 148 and second fluid opening 156 are in a parallel relationship with each other. The second fluid opening 156 is provided in an upper portion 158 of the second wall portion 152 above and opposite the first fluid opening 148.

The second fluid opening 156 enables fluid communication between the second valve cavity 146 and the atmosphere. More particularly, on a side, the second fluid opening 156 is in fluid communication with an upper chamber portion 160 provided in the second valve cavity 146. On an opposite side, the second fluid opening 156 is in fluid communication with the atmosphere via the chamber 56 formed in the control unit 12. The chamber 56 is in fluid communication with the atmosphere via a vent passage 162, which is illustrated in FIG. 1.

Referring back to FIG. 6, the second portion 90 of the control and supply valve assembly 32 is selectively in fluid communication with the first fluid conduit 38 via a third fluid opening 164. The first fluid opening 148 and third fluid opening 164 are in a parallel relationship with each other and are selectively in fluid communication. The third fluid opening 164 is provided in a middle portion 166 of the second wall portion 152 opposite and below the second fluid opening 156.

The third fluid opening 164 enables fluid communication between the second valve cavity 146 and the first fluid conduit 38. More particularly, on a side, the third fluid opening 184 is in fluid communication with a middle chamber portion 168 provided in the second valve cavity 146. On an opposite side, the third fluid opening 164 is in fluid communication with a portion of the first fluid conduit 38.

As illustrated in FIG. 6, the second valve cavity 146 is of a generally cylindrical shape. A second valve cavity insert 170 is disposed within the second valve cavity 146 to direct pressurized air through the second valve cavity 146 and to or from the third fluid opening 164. The second valve cavity insert 170 is in a sealed relationship with the valve housing 72 and partially defines the lower chamber portion 154, the upper chamber portion 160 and the middle chamber portion 168.

The second valve cavity insert 170 includes one or more annular portions 172, 172A and one or more cylindrical portions 173, 173A. Each annular portion 172, 172A is attached to an adjacent annular portion by a wall portion and each annular portion 172, 172A is attached to one of the cylindrical portions 173, 173A by a wall portion. An aperture 174, 174A is provided through each annular portion 172, 172A to facilitate the movement of pressurized air through the second valve cavity 146.

A sealing member 176, 176A, 177, 177A is provided around each annular portion 172, 172A and each cylindrical portion 173, 173A. Preferably, each sealing member 176, 176A, 177, 177A is disposed in a groove and is ring-shaped. Preferably, each sealing member 176, 176A, 177, 177A is formed from an elastomeric material. In an embodiment, each sealing member 176, 176A, 177, 177A is an O-ring. Each sealing member 176, 176A, 177, 177A provides a seal between one of the annular portions 172, 172A or one of the cylindrical portions 173, 173A and an inner surface 178 of the second wall portion 152 which allows the second valve cavity insert 170 to be in a sealed relationship with the second portion 126 of the valve housing 72.

As noted above, the second portion 90 of the control and supply valve assembly 32 also includes the lower chamber portion 154, the upper chamber portion 160, and the middle chamber portion 168. The upper chamber portion 160 is in fluid communication with the chamber 56 formed in the control unit 12 via the second fluid opening 156. The upper chamber portion 160 is also selectively in fluid communication with the middle chamber portion 168. The upper chamber portion 160 is in fluid communication with the middle chamber portion 168 when, for example, it is desired to vent the first fluid conduit 38. Additionally, the upper chamber portion 160 is in fluid communication with the middle chamber portion 168 when, for example, it is desired to decrease the tire pressure. As noted above, the middle chamber portion 168 is in fluid communication with the first fluid conduit 38 via the third fluid opening 164. The lower chamber portion 154 is also selectively in fluid communication with the middle chamber portion 168. The lower chamber portion 154 may be in fluid communication with the middle chamber portion 168 when, for example, it is desired to determine, increase, and/or decrease the tire pressure.

The second portion 90 of the control and supply valve assembly 32 includes a second biasing member (not depicted). The second biasing member is attached to a second poppet 180. The second poppet 180 is moveable in response to the second biasing member. The second poppet 180 moves between and seals against the annular portions 172, 172A of the second valve cavity insert 170. The second biasing member is moved and moves the second poppet 180 when the second solenoid valve 34 is energized or de-energized. In an embodiment, when a signal from the electronic control portion 16 is received by the second solenoid valve 34, the second biasing member urges the second poppet 180 toward the upper chamber portion 160. In another embodiment, when a signal from the electronic control portion 16 is not received by the second solenoid valve 34, the second biasing member urges the second poppet 180 toward the lower chamber portion 154.

When the second biasing member urges the second poppet 180 toward the upper chamber portion 160, the second poppet 180 seals against an annular portion 172 of the second valve cavity insert 170. When the second poppet 180 seals against the second valve cavity insert 170, the lower chamber portion 154 is in fluid communication with the middle chamber portion 168. As noted above, the lower chamber portion 154 is in fluid communication with the middle chamber portion 168 to allow the tire pressure to be determined, increased, and/or decreased. When the second biasing member urges the second poppet 180 toward the lower chamber portion 154, the second poppet 180 seals against another annular portion 172A of the second valve cavity insert 170. When the second poppet 180 seals against the second valve cavity insert 170, the upper chamber portion 160 is in fluid communication with the middle chamber portion 168. As noted above, the upper chamber portion 160 is in fluid communication with the middle chamber portion 168 to allow the first fluid conduit 38 to be vented or the tire pressure to be decreased.

Figure 9:
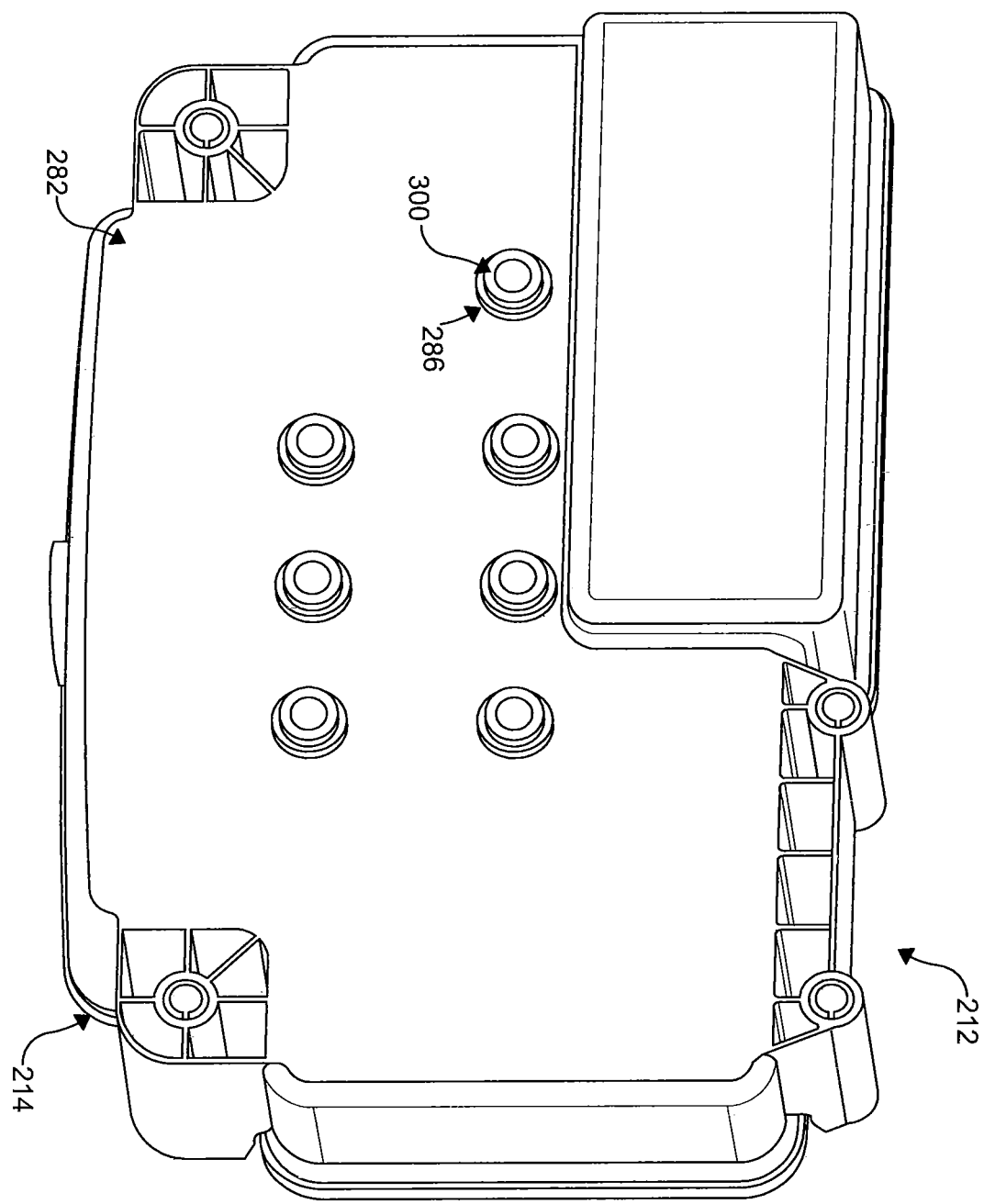
FIG. 9 is an isometric view of an embodiment of a control unit of the tire pressure management system of FIG. 8.
Figure 10:
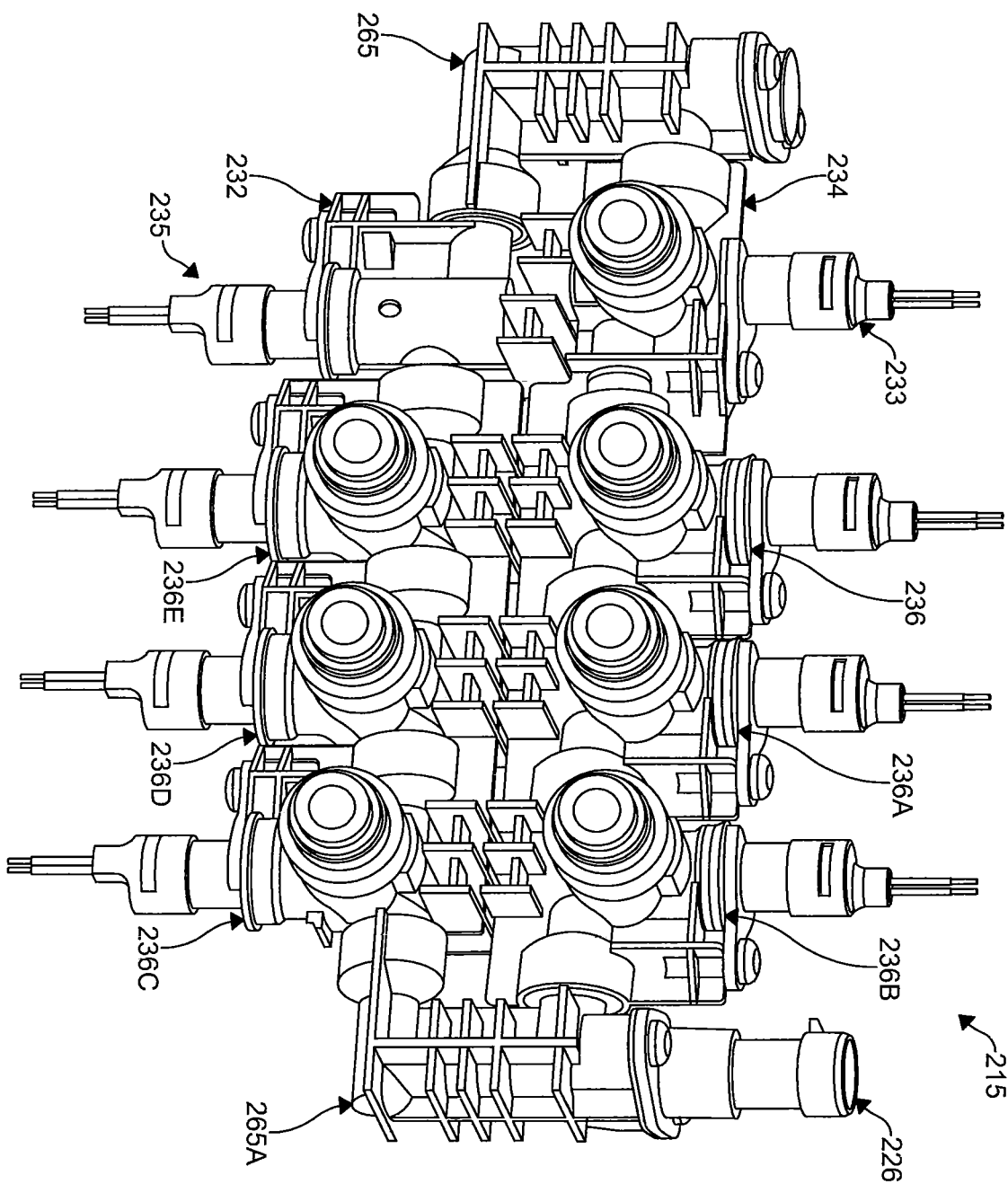
FIG. 10 is an isometric view of another embodiment of a valve assembly system in accordance with the invention.

Referring now to FIGS. 8-10, in another preferred embodiment, the first fluid conduit 238 is in fluid communication with the pressure sensor 226 and valve assemblies 232, 234, 236, 236A, 236B, 236C, 236D, 236E. The fluid conduit 238 is also selectively in fluid communication with a chamber (not shown) defined by the space between the control unit housing 214 a valve assembly system 215. Referring to FIG. 10, in one embodiment the valve assembly system 215 includes the pressure sensor 226, the valve assemblies 232, 234, 236, 236A, 236B, 236C, 236D, 236E and at least two connecting modules 265, 265A. The first fluid conduit 238 is also attached to and in fluid communication with one or more connecting modules 265 as depicted in FIG. 8. As shown in FIG. 10, in one preferred embodiment the number the valve assemblies includes six channel valve assemblies 236, 236A, 236B, 236C, 236D, 236E and two connecting modules 265, 265A. It is understood that the number of channel valve assemblies can vary as needed to accommodate the number of wheels on a vehicle.

Referring back to FIG. 8, in one preferred embodiment a channel valve assembly 236, 236A, 236B, 236C, 236D, 236E is provided for each wheel assembly 258, 258A, 258B, 258C, 258D, 258E and each is attached to and in fluid communication with the first fluid conduit 238. Preferably, each channel valve assembly 236, 236A, 236B, 236C, 236D, 236E enables fluid communication between the first fluid conduit 238 and a fluid control circuit 260, 260A, 260B, 260C, 260D, 260E.

Preferably, the channel valve assemblies 236, 236A, 236B, 236C, 236D, 236E are similarly configured. Thus, for describing the features of the channel valve assemblies 236, 236A, 236B, 236C, 236D, 236E, only one channel valve assembly 236 will be referred to below.

Also, it is preferred that each fluid control circuit 260, 260A, 260B, 260C, 260D, 260E is similarly configured. Thus, for describing the features of the fluid control circuits 260, 260A, 260B, 260C, 260D, 260E only one fluid control circuit 260 will be referred to below. Preferably, the fluid control circuit 260 includes one or more fluid conduits 262, a rotary joint assembly 264 and/or a hose assembly (not depicted).

Further, it is preferred that each wheel assembly 258, 258A, 258B, 258C, 258D, 258E is similarly configured. Thus, for describing the features of the wheel assembly 258, 258A, 258B, 258C, 258D, 258E, only one wheel assembly 258 will be referred to below. The wheel assembly 258 includes a tire 266 and a wheel rim 268. An axle may be coupled to the wheel rim 268. A space 270 between the tire 266 and the wheel rim 268 is configured to house pressurized air.

The pressurized air housed within the space 270 is referred to herein as "tire pressure." Tire pressure is increased by the addition of pressurized air into the space 270 and decreased by the removal of air from the space 270. Preferably, the tire pressure is equal to a target tire pressure. The target tire pressure can be selected by an operator of the vehicle to be a desired pressure. After the target tire pressure is selected, it can be programmed into the control unit 212 via the electronic control portion 216. The target tire pressure can also be pre-programmed into the control unit 212. To ascertain if the tire pressure is equal to the target tire pressure, the tire pressure is measured. As noted above, the control unit 212 is configured to enable measuring the tire pressure.

Preferably, the wheel valve 254 is attached to the wheel assembly 258. The wheel valve 254 separates the fluid control circuit 260 from the wheel assembly 258 and is utilized to retain pressurized air therein. Also, the wheel valve 254 allows the wheel assembly 258 to selectively communicate with the control unit 212 via the fluid control circuit 260. The wheel valve 254 may be of the check valve variety.

When the channel valve assembly 236 is in the open position, the first fluid conduit 238 is in fluid communication with the fluid control circuit 260. The fluid control circuit 260 is capable of fluid communication with the wheel assembly 258 via the wheel valve 254. When the first fluid conduit 238 is in fluid communication with the fluid control circuit 260, a flow of air from the source of pressurized air 244 can be directed to the wheel assembly 258 via a supply valve assembly 234, the channel valve assembly 236, the fluid control circuit 260, and the wheel valve 254. Thus, the channel valve assembly 236 is utilized to promote airflow from the source of pressurized air 244 to the wheel assembly 258.

The supply valve assembly 234 is provided within the control unit housing 214 and is in fluid communication with the first fluid conduit 238 and the air supply circuit 240. In certain embodiments, a control valve assembly 232 is utilized to communicate a first flow or bleed of pressurized air to the first fluid conduit 238 and the supply valve assembly 234 is utilized to communicate a second flow of pressurized air to the first fluid conduit 238. The flowrate of the second flow of pressurized air is greater than the flowrate of the first flow of pressurized air.

Figure 11:
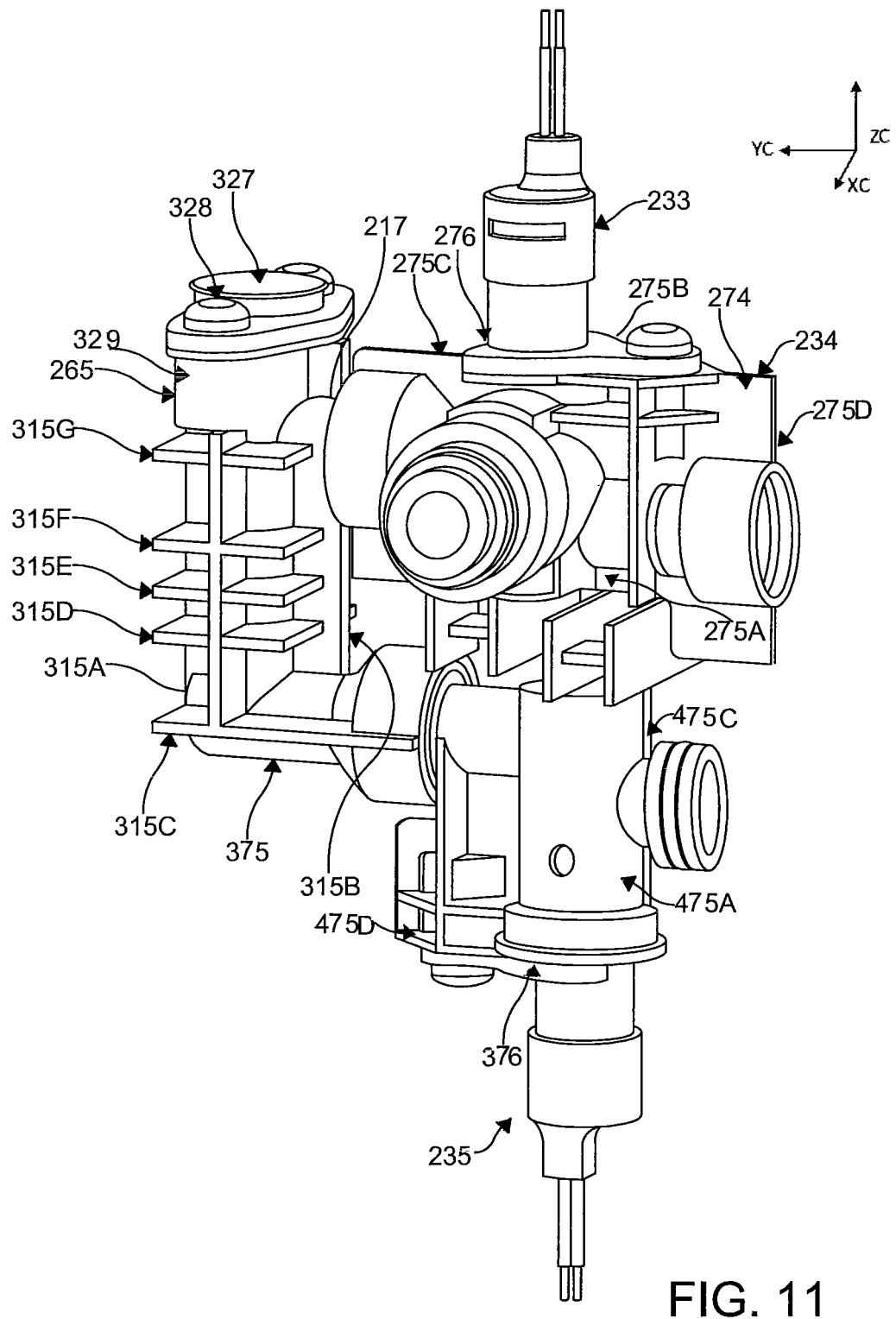
FIG. 11 is a front view of another embodiment of a supply valve assembly, a control valve assembly and a connecting module in accordance with the invention.
Figure 12:
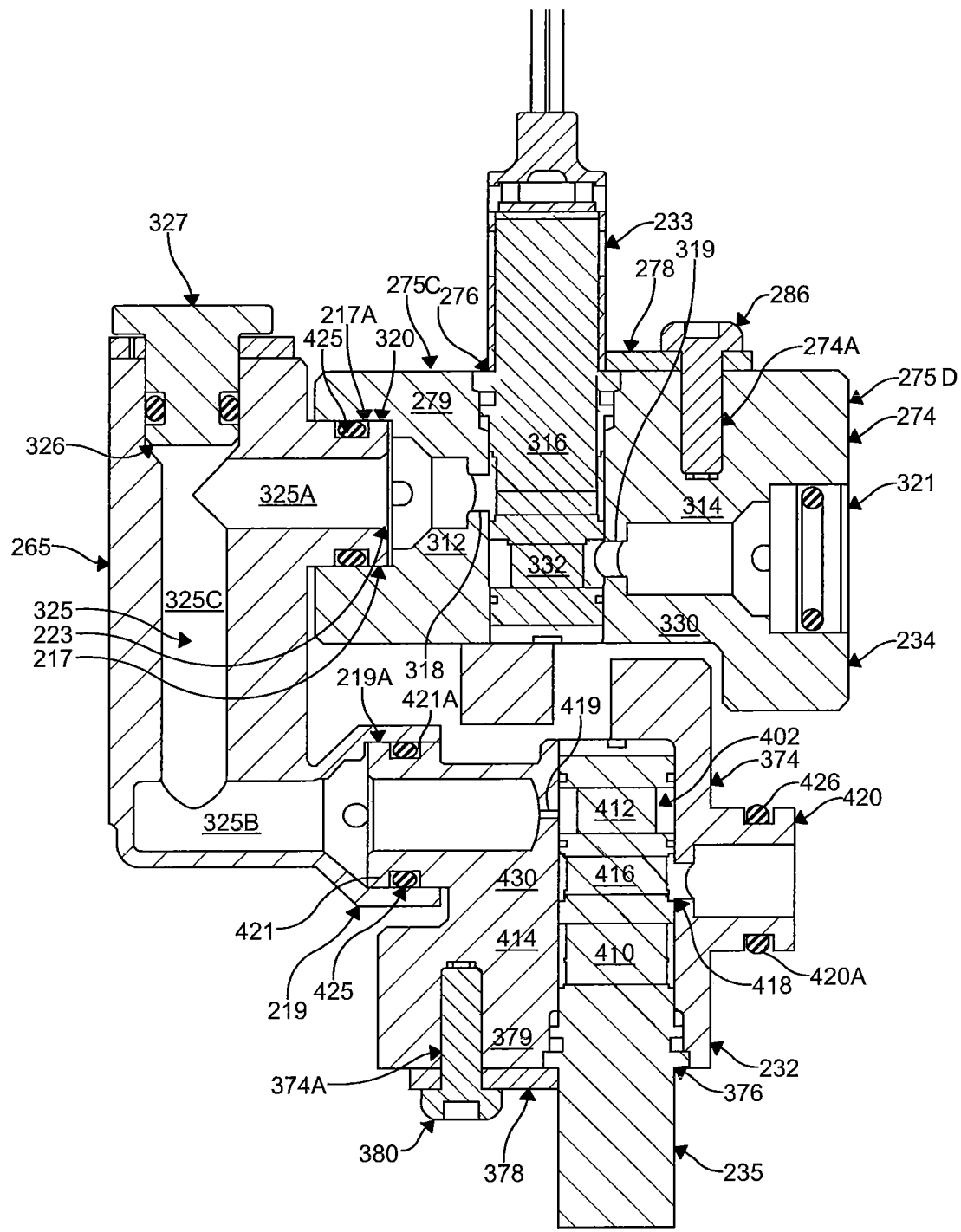
FIG. 12 is a cross-sectional view through a portion of the supply valve assembly, control valve assembly and connecting module of FIG. 11.

Referring now to FIGS. 11-12, the supply valve assembly 234 is of the two-way variety. The supply valve assembly 234 includes a solenoid valve 233 and a supply valve housing 274. The supply valve housing includes an outer surface 275 having a front outer surface 275A, a rear outer surface 275B and two side outer surfaces 275C, 275D. The solenoid valve 233 is fitted within a first opening 276 located in an upper portion 279 of the supply valve housing 274 as depicted in FIG. 12. Preferably, the supply valve housing 274 is formed in a unitary manner. More preferably, the supply valve housing 274 is formed with a rigid polymeric material and from an injection molding process.

Figure 13:
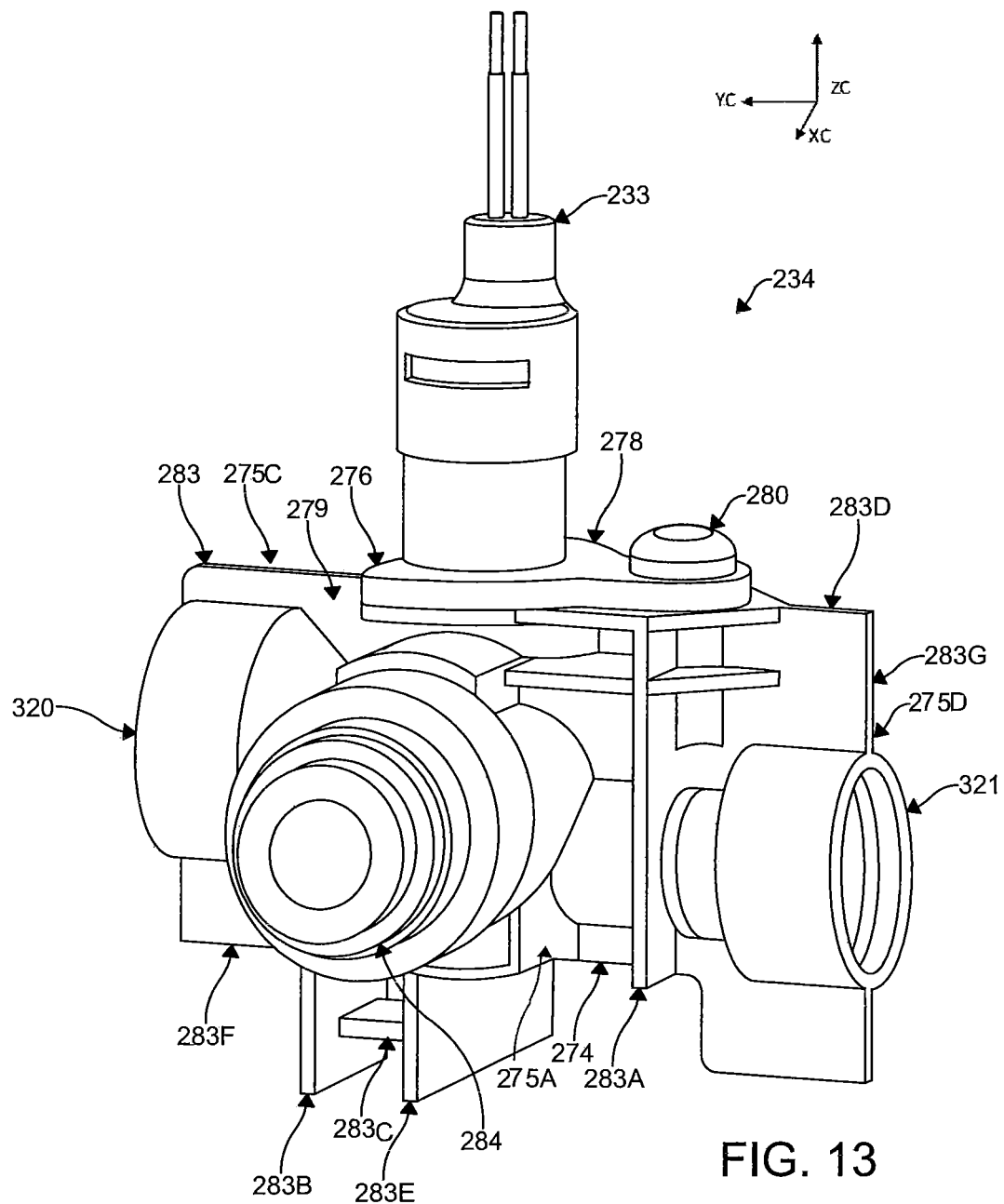
FIG. 13 is a front view of another embodiment of a supply valve assembly in accordance with the invention.

Referring now to FIG. 13, in one embodiment the supply valve housing 274 includes the first opening 276, a first port 320, a second port 321 and a third port 284. The first port 320 and second port 321 are parallel to each other and perpendicular to the first opening 276 and third port 284. The third port 284 is perpendicular to the first opening 276. The first port 320 and second port 321 extend away from the center of the supply valve housing 274 in opposite directions.

Referring now to FIGS. 12-13, in one embodiment the supply valve housing 274 includes an attaching portion 278. The attaching portion 278 is utilized to secure the solenoid valve 233 to the supply valve housing 274. The solenoid valve 233 is secured to the supply valve housing 274 by inserting a fastener 280 through the attaching portion 278 and into a receiving portion 274A in supply valve housing 274.

Figure 14:
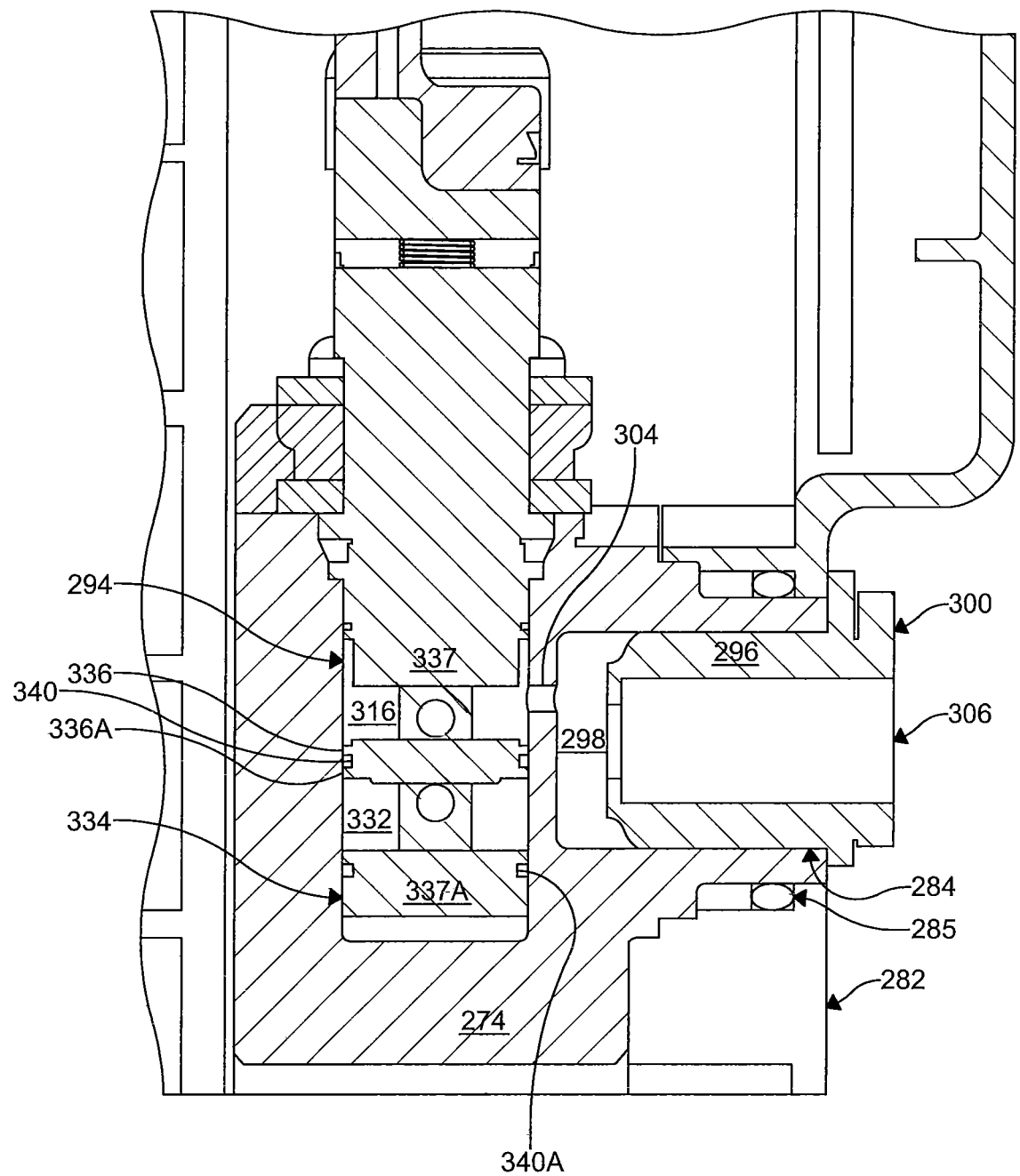
FIG. 14 is a cross-sectional view through a portion of the supply valve assembly of FIG. 13 in the control unit of FIG. 9.

Referring now to FIG. 14, in one embodiment the third port 284 is of a generally cylindrical shape and is in a sealed relationship with the cover member 282. The third port 284 includes a wall member 296 which defines a cavity 298. The cavity 298 receives a port insert 300. The third port 284 of the supply valve housing 274 extends into an opening 286 in the cover member 282 as shown in FIG. 9.

Referring now to FIGS. 8 and 14, the port insert 300 is a generally cylindrical-shaped member. The port insert 300 includes a retainer portion (not depicted) which defines an outer opening 306. The port insert 300 is inserted through the outer opening 306 to allow fluid communication with air supply circuit 240. A sealing member 285 is provided on the outer surface of third port 284. The sealing member 285 provides a seal between the third port 284 and the cover member 282. Preferably, the sealing member 285 is an O-ring. The third port 284 is in fluid communication with a valve cavity 294.

The port insert 300 can also be provided in the cavity 298 to receive a portion of the air supply circuit 240 to enable the air supply circuit 240 and the third port 284 to be in a sealed relationship. In this embodiment, the supply valve housing 274 is attached to the air supply circuit 240 by inserting a portion of the air supply circuit 240 through the outer opening 306 and by engagement of the retaining member with the portion of the air supply circuit 240 inserted therein.

As shown best in FIGS. 9 and 14, the third port 284 is in a sealed relationship with a cover member 282 using a sealing member 285. The supply valve housing 274 is engaged with a cover member 282 of the control unit housing 214. More particularly, the third port 284 of the supply valve housing 274 extends into an opening 286 in the cover member 282.

Referring now to FIGS. 12-14, in one embodiment the supply valve assembly 234 is in fluid communication with the air supply circuit 240 via a third fluid opening 304 and is in selective fluid communication with the first fluid conduit 238 via the second fluid opening 319. A first fluid opening 318 is in fluid connection with the first port 320. The first port 320 is provided in a middle portion 312 of a sidewall 314. The first port 320 has a generally cylindrical shape opening and is capable of receiving a portion of the connecting module 265.

The first fluid opening 318 enables fluid communication between the valve cavity 294 and the source of pressurized air 244 via the air supply circuit 240. More particularly, on a side, the first fluid opening 318 is in fluid communication with an upper chamber portion 316 provided in the valve cavity 294. On an opposite side, the first fluid opening 318 is in fluid communication with port 320.

In one embodiment the valve cavity 294 and the second port 321 are in fluid communication via the second fluid opening 319. The second fluid opening 319 is provided in a lower portion 330 of a sidewall 314 of the supply valve housing 274 below attaching portion 278. The sidewall 314 partially defines the second port 321 and the valve cavity 294. The second port 321 is capable of receiving a portion of the channel valve assembly 236 in a sealed relationship. Port 320 and 321 are parallel to each other. The second fluid opening 319 enables fluid communication between the valve cavity 294 and the first fluid conduit 238. More particularly, an a side, the second fluid opening 319 is in fluid communication with a lower chamber portion 332 provided in the valve cavity 294. On an opposite side, the second fluid opening 319 is in fluid communication with port 321. The second fluid opening 319 also enables fluid communication between the fluid control circuit 260 and the source of pressurized air 244 via the first fluid conduit 238.

Referring now to FIG. 14, the third fluid opening 304 is in fluid communication with the first fluid opening 318 and is in selective communication with the second fluid opening 319 via the upper chamber portion 316. The third fluid opening 304 is perpendicular to the first and second fluid openings 320, 321. The third fluid opening 304 enables fluid communication between the third port 284 and the first fluid conduit 238. More particularly, on a side, the third fluid opening 304 is in fluid communication with the upper chamber portion 316 provided in the valve cavity 294. On an opposite side, the third fluid opening 304 is in fluid communication with port 284.

Referring now to FIG. 13, in one embodiment the supply valve housing 274 has an outer surface 275 having structural support elements illustrated by 283A, 283B, 283C, 283D, 283E, 283F, 283G protruding therefrom. In one embodiment, the structural support elements 283A, 283B, 283C, 283D, 283E, 283F, 283G are shaped as ribbing. The ribbing elements 283A, 283B, 283C, 283D, 283E, 283F, 283G extend from and along the outer surface 275 such that at least a portion of the ribbing elements 283A, 283B, 283C, 283D, 283E, 283F, 283G are in direct contact with an inner surface of the control unit housing 214 and other components of the system 215 in a form-fitting manner. The ribbing 283A, 283B, 283C, 283D, 283E, 283F, 283G provides structure to the supply valve housing 274. The structural support elements aid in supporting the supply valve assembly 274 and to provide structure to the valve assembly system 215 such that the system can fit within the control unit housing 214 securely without requiring additional fasteners to secure the system as depicted in FIG. 10.

In one embodiment, as shown in FIG. 13, ribbing 283D extends out from the outer surface 275 in the XC direction horizontally from the valve cavity 294, around the receiving portion 274A, below the attachment portion 278. Similar ribbing (not pictured) extends in the opposite direction XC axis to provide support to the back of the system which mates with the control unit housing 214. Ribbing 283A extends from the outer surface 275 in the XC portion and runs vertically the length of side wall 314 from the below attachment portion 278 and around the receiving portion 274A. Ribbing 283A is perpendicular to ribbing 283D and parallel to valve cavity 294. Ribbing 283G extends from the outer surface 275 in the YC direction and runs vertically from the opening 276 to below the second port 321. Ribbing 283G is perpendicular to ribbing 283D and 283A. Ribbing 283B, 283E extend from the outer surface 275 in the XC direction and runs vertically below the valve cavity 294, parallel to the valve cavity 294. Ribbing 283B, 283E are perpendicular to ribbing 283C, 283F. Ribbing 283E extends vertically below the middle of the valve cavity 294. Ribbing 283B extends vertically below wall 296 of the port 284 closes to port 320. Ribbing 283C extends in the XC direction from the outer surface 275 and runs horizontally below the insert cavity 294 between and perpendicular to ribbing 283B, 283E. Ribbing 283F extends out from the outer surface 275 in the YC direction and runs vertically from above port 320 to below port 320, extending from the opening 276 to the end to ribbing 283E.

Ribbing 283A, 283B, 283C, 283D, 283E provides support for the structure where the supply valve housing 274 mates against the cover member 282. Ribbing 283F, 283G provide support for the structure where the supply valve housing 274 mates against valve assemblies 232, 236 and connecting module 265. It is understood that ribbing 283A, 283B, 283C, 283D, 283E, 283F, 283G can be constructed in various arrangements such that the ribbing provides support and aids in mating the valve assemblies 234, 236, connecting modules 265, 265A and control unit housing 214 to each other without the use of additional fasteners.

Referring now to FIG. 12, the supply valve assembly 234 is in fluid communication with the control valve assembly 232 via the connecting module 265 which extends therebetween. The connecting module 265 is in fluid communication with the first fluid conduit 238 via the supply valve assembly 234 and the control valve assembly 232. In certain embodiments, as depicted in FIG. 10, a second connecting module 265A can also connect two valve assemblies 236B, 236C. Connecting modules 265, 265A allow the valve assemblies 232, 234, 236, 236A, 236B, 236C, 236D, 236E to be arranged such that the valve assemblies can be stacked, as depicted in FIG. 10, and remain in fluid communication with each other and the first fluid conduit 238. The stacked valve assembly arrangement allows for additional valve assemblies to be added to the valve assembly system 215 while maintaining a compact arrangement in the control unit housing 214. It is understood that the number valve of channel assemblies 236, 236A, 236B, 236C, 236D, 236E and connecting modules 265, 265A can vary as needed to accommodate the number of wheels on a vehicle and to maintain the compact arrangement of control unit housing 214. Preferably, connecting module 265, 265A are formed in a unitary manner. More preferably, connecting modules 265, 265A are formed with a rigid polymeric material and from an injection molding process.

Referring now to FIG. 12, in one embodiment the connecting module 265 includes a first port 217 and a second port 219 in fluid connection with each other. The first port 217 connects to the valve housing 274 of the supply valve assembly 234. The first port 217 is of a generally cylindrical shape and is in a sealed relationship with the supply valve assembly 234. The first port 217 includes a wall member 322 which defines a cavity 223. The first port 217 is attached to valve housing 274 by inserting the first port 217 in port 320 of the supply valve assembly 234. The first port 217 may include a sealing member 425 located on the outer surface of the first port 217 in a groove 217a to provide a seal between the supply valve assembly 234 and the connecting module 265. Preferably, the sealing member 425 is an O-ring.

The second port 219 is connected to the control valve assembly 232. The second port 219 has a generally cylindrical shaped cavity 219A and is in a sealed relationship with the control valve assembly 232. The second port 219 includes a wall member 227 which defines the cavity 219A. The second port 219 is attached to the valve housing 274 by inserting a port 421 of the control valve assembly 232 into the cavity 219A. Port 421 of control valve assembly may include a sealing member 425 to provide a seal between the control valve assembly 232 and port 219. Preferably, the sealing member 425 is an O-ring.

The connecting module 265 has a conduit 325 which is part of air supply circuit 240 that fluidly connects the supply valve assembly 234 to the control valve assembly 232. In one embodiment, the conduit 325 includes two horizontal portion 325A, 325B connected and a vertical portion 325C. Horizontal portion 325A fluidly connects cavity 223 to vertical portion 325C. Horizontal portion 325B fluidly connects port 219 to vertical portion 325C. Vertical portion 325C extends from horizontal portion 325B to above horizontal portion 325A and is in fluid communication with an opening 326 in the connecting module 265. A cover member 327 is inserted into the opening 326 of the connecting module 265 and is attached using one or more fasteners 328 which are received into one or more receiving portions 329 in the connecting module 265 as shown in FIG. 11.

Referring now to FIG. 11, in one embodiment the connecting module 265 has an outer surface 375 that has ribbing 315A, 315B, 315C, 315D, 315E, 315F, 315G running vertically and horizontally from the outer surface 375 to provide structure to the connecting module 265 and allow the connecting module 265 to be held within control unit housing 214 without requiring additional fasteners. Ribbing 315A, 315B, 315C, 315D, 315E, 315F, 315G enhances the mechanical strength of the connecting module 265.

In one embodiment ribbing 315A extends from the outer surface 375 in the XC direction and runs vertically extending from the below cover member 327 to below the fluid conduit 325B. Similar ribbing 315A (not shown) extends in the reverse XC direction. Ribbing 315C extends from the outer surface 375 in the XC direction, horizontally around port 219 of connecting module 265 and the horizontal portion 325B of the conduit 319, and is perpendicular to ribbing 315A. Ribbing 315B extends in the YC direction from the outer surface 375 and runs vertically from below the cover 327, around the first port 217 to the horizontal portion 325B of the conduit 325. Ribbing 315D, 315E, 315F extends in the XC direction horizontally around the outer surface 315A of the vertical portion 325C. Ribbing 315D, 315E, 315F is parallel to each other and ribbing 315C and is perpendicular to ribbing 315A. Ribbing 315G extends in the XC direction horizontally around the first port 217 of the connecting module 265 and the horizontal portion 325A of the conduit 325. Ribbing 315G is parallel to ribbing 315C, 315D, 315E, 315F and perpendicular to ribbing 315A. The ribbing can be in various arrangements such that the ribbing provides support and aids in mating the valve assemblies 232, 234, 236, 236A, 236B, 236C, 236O, 236E, connecting modules 265, 265A and the control unit housing 214 to each other without the use of additional fasteners.

Figure 15:
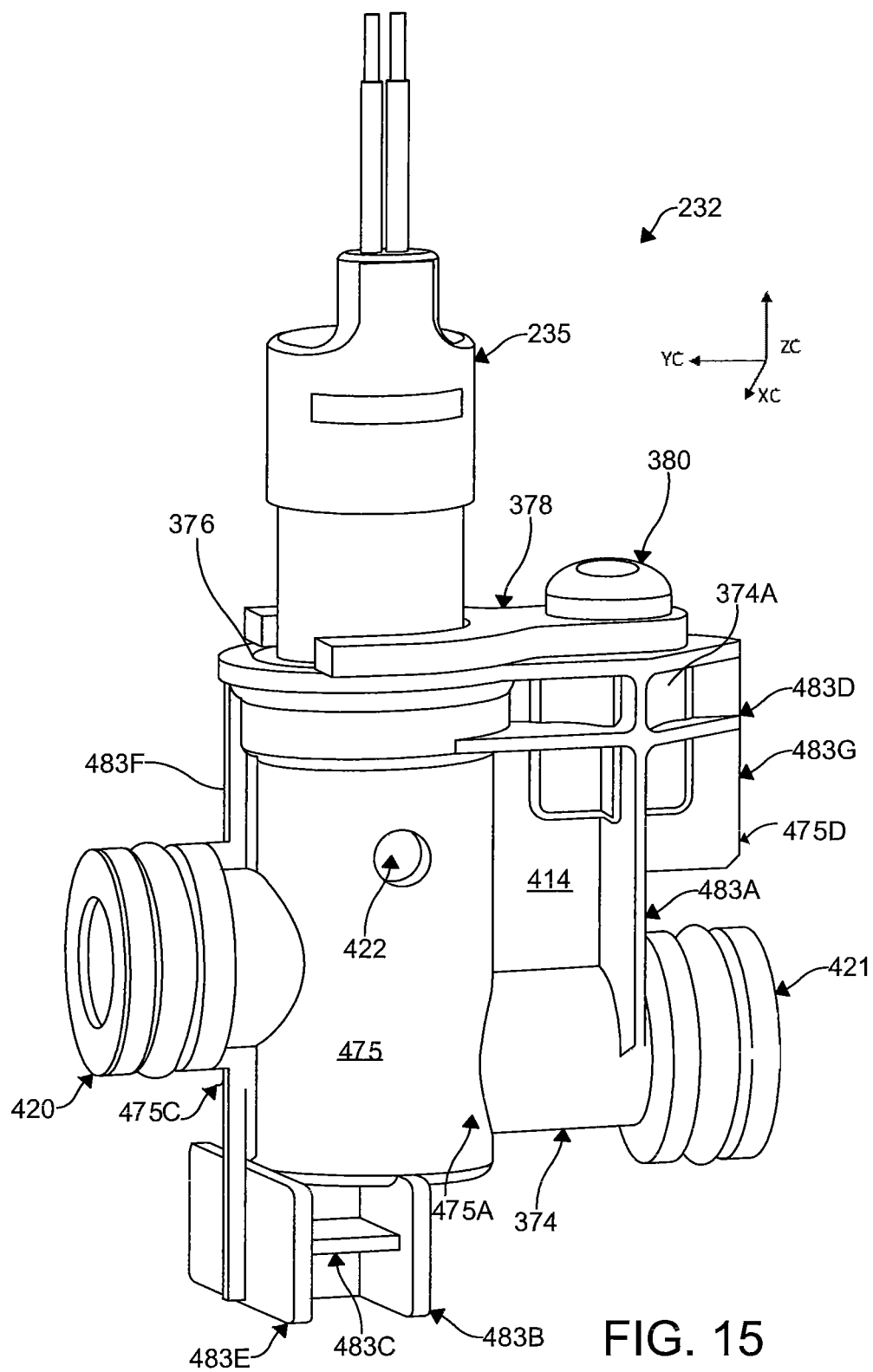
FIG. 15 is a front view of another embodiment of a control valve assembly in accordance with the invention.

Referring now to FIGS. 12 and 15, in one embodiment the connecting module 265 connects the supply valve assembly 234 to the control valve assembly 232. The control valve assembly 232 is of the three-way variety. The control valve assembly 232 includes a solenoid valve 235 and a control valve housing 374. The control valve assembly 374 has an outer surface 375 including a front outer surface 375A, a rear outer surface 375B, and two side outer surfaces 375 C, 375D. The solenoid valve 235 is fitted within a first opening 376 located in an upper portion 379 of the control valve housing 374. Preferably, the control valve housing 374 is formed in a unitary manner. More preferably, the control valve housing 374 is formed with a rigid polymeric material and from an injection molding process.

Referring now to FIG. 12, in one embodiment the control valve housing includes an outer surface 475 having a front outer surface 475A, a rear outer surface 475B, two side outer surfaces 475C, 475D, the first opening 376, a first port 420 and the second port 421. The first port 420 and second port 421 are parallel to each other and perpendicular to the first opening 376. The first port 420 and second port 421 extend away from the center of the control valve housing 374 in opposite directions along the YC axis.

In one embodiment, the control valve housing 374 includes an attaching portion 378. The attaching portion 378 is utilized to secure the solenoid valve 235 to the control valve housing 374. The solenoid valve 235 is secured to the control valve housing 374 by inserting a fastener 380 through the attaching portion 378 and into a receiving portion 374A in control valve housing 374.

In one embodiment, the control valve housing 374 also includes a valve cavity 402. The valve cavity 402 is generally cylindrical in shape. The valve cavity 402 and the second port 421 are in fluid communication via a first fluid opening 419. The first fluid opening 419 is provided in a lower portion 430 of a sidewall 414 of the control valve housing 374 below the attaching portion 378. The sidewall 414 partially defines the second port 421 and the valve cavity 402. The second port 421 is connected to the connecting module 265 by inserting the second port 421 into the port 219 of connecting module 265. The second port 421 is generally cylindrical in shape and may include a sealing member 425 located on the outer surface of the second port 421 in a groove 421A to provide a seal between the connecting module 265 and the control valve assembly 232. Preferably, the sealing member 425 is an O-ring.

In one embodiment, the control valve assembly 232 is selectively in fluid communication with the air supply circuit 240 via the first fluid opening 419. The first fluid opening 419 enables fluid communication between the valve cavity 402 and the source of pressurized air 244 via the air supply circuit 240. More particularly, on a side, the first fluid opening 419 is in fluid communication with a lower chamber portion 412 provided in the valve cavity 402 and on the opposite side is in fluid connection with the second port 421.

A second fluid opening 418 enables fluid communication between the valve cavity 402 and the first fluid conduit 238. More particularly, on a side, the second fluid opening 418 is in fluid communication with a middle chamber portion 416 provided in the valve cavity 402. On an opposite side, the second fluid opening 418 is in fluid communication with the first port 420. The first port 420 is capable being inserted into a portion of the channel valve assembly 236 in a sealed relationship. Ports 420 and 421 are parallel to each other. The first port 420 is generally cylindrical in shape and may include a sealing member 426 located on the outer surface of the first port 420 in a groove 420a to provide a seal between the connecting module 265 and the channel valve assembly 236. Preferably, the sealing member 426 is an O-ring.

Referring now to FIG. 15, in one embodiment the control valve housing 374 has an outer surface 475 having structural support elements illustrated in FIG. 15 by 483A, 483B, 483C, 483D, 483E, 483F, 483G protruding therefrom. In one embodiment, the structural support elements 483A, 483B, 483C, 483D, 483E, 483F, 483G are shaped as ribbing. The ribbing elements 483A, 483B, 483C, 483D, 483E, 483F, 483G extend from and along the outer surface 483 such that a least a portion of the ribbing elements 483A, 483B, 483C, 483D, 483E, 483F, 483G are in direct contact with the inner surface of the control unit housing 214 and other components of the system 215 in a form-fitting manner. The ribbing 483A, 483B, 483C, 483D, 483E, 483F, 483G provides structure to the control valve housing 374. The ribbing structure aids in supporting the control valve assembly 374 and to provide a structure to the valve assembly system 215 such that the system can fit within the control unit housing 214 securely without requiring additional fasteners to securing the system depicted in FIG. 10.

In one embodiment, ribbing 483A extends in the XC direction from the outer surface 483 and runs vertical from below the attaching portion 378 to the middle of the port 421. Ribbing 483D extends in the XC direction from the outer surface 483 and runs horizontally from the valve cavity 402 and around the receiving portion 374A. Ribbing 483D is perpendicular to ribbing 483A. Similar ribbing (not pictured) extends in the opposite direction along the XC axis to provide support to the back of the system 215 which mates with the control unit housing 214. Ribbing 483G extends in the YC direction out from the outer surface 483 and runs vertically from below the opening 376 and around the receiving portion 374A to the middle of sidewall 414. Ribbing 483G is perpendicular to ribbing 483D and 483A. Ribbing 483F extends in the YC direction out from outer surface 483 and runs vertically from the first opening 376 to below the valve cavity 402. Ribbing 483G and 483F are parallel to each other. Ribbing 483B, 483E extend in the XC direction out from outer surface 483 and run vertically below the valve cavity 402 and extend the beyond the width of the first port 420 in the XC direction. Ribbing 483, 483E are perpendicular to ribbing 483C and 483F. Ribbing 483B extends vertically below the middle of the valve cavity 402. Ribbing 483C extends in the XC direction out from the outer surface 483 and runs horizontally below the valve cavity 402 between and perpendicular to ribbing 483B, 483E.

Ribbing 483A, 4838, 483E provide support for the structure where the control valve housing 374 mates against the cover member 282. Ribbing 483F, 483G support for the structure where the control valve housing 374 mates against valve assemblies 234, 236 and connecting module 265. The ribbing 483A, 483B, 483C, 483D, 483E, 483F, 483G can be constructed in various arrangements such that the ribbing provides support and aids in mating the valve assemblies 234, 236, connecting modules 265, 265A and control unit housing 214 to each other without the use of additional fasteners.

The control valve assembly 232 includes a third fluid opening 422. The third fluid opening 422 enables fluid communication between the valve cavity 402 and the atmosphere. More particularly, on a side, the third fluid opening 422 is in fluid communication with an upper chamber portion 410 provided in the valve cavity 402. The third fluid opening 422 extends through the front outer surface 475A of the valve housing 374. On an opposite side, the third fluid opening 422 is in fluid communication with the atmosphere via the chamber 256 formed in the control unit 212 between the valve assembly system 215 and the control unit housing 214. The chamber 256 is in fluid communication with the atmosphere via a vent passage 365, which is illustrated in FIG. 8. In one embodiment, the vent passage 365 may include a check valve. The control unit housing 214 may include a wear patch (not shown) between the inner surface of the control unit housing 214 and the outer surface 375 of the control valve assembly 324 around the vent passage 365.

In one embodiment, as shown in FIG. 11, the supply valve assembly 234 is stacked on top of the control channel valve assembly 232 such that the front outer surfaces 275A, 475A of the supply valve assembly 234 and the control valve assembly 232 face the same direction and the first openings 276, 376 of the supply valve assembly 234 and the control valve assembly 232 extend in opposite directions.

In another embodiment, the supply valve assembly 235 can located adjacent the control valve assembly 232 such that the second port 420 of the control valve assembly 232 fits inside the second port 321 of the supply valve assembly 324.

The supply valve assembly 234 and the control valve assembly 232 may receive a signal from the electronic control portion 216. More particularly, in certain embodiments, the supply valve assembly 234 and control valve assembly 232 may receive one or more signals from the electronic control portion 216.

For example, separate signals from the electronic control portion 216 are received by the supply solenoid valve 233 and the control solenoid valve 235. Also, as noted above, the signals received by the solenoid valves 233, 235 may be an electrical current. Similarly, in certain embodiments, one or both of the signals can be removed.

For describing the tire pressure management system 210 provided herein, when an electrical current is received by solenoid valves 233, 235, the solenoid valve 233, 235 receiving the current may be referred to as being "energized." When no electrical current is received by the solenoid valves 233, 235 or when electrical current is removed from the solenoid valves 233, 235, the solenoid valves 233, 235 may be referred to as being "de-energized." Preferably, each solenoid valve 233, 235 is normally de-energized.

When solenoid valve 233 is energized, the air supply circuit 240 is in fluid communication with the first fluid conduit 238 via the supply valve assembly 234. When the air supply circuit 240 is in fluid communication with the first fluid conduit 238 via the supply valve assembly 234, the second flow of pressurized air can be communicated to the first fluid conduit 238. When the first solenoid valve 233 is de-energized, the air supply circuit 240 is not in fluid communication with the first fluid conduit 238 via the supply valve assembly.

When solenoid valve 235 is energized, the air supply circuit 240 is in fluid communication with the first fluid conduit 238 via the control valve assembly 232. When the air supply circuit 240 is in fluid communication with the first fluid conduit 238 via the control valve assembly 232, the first flow of pressurized air can be communicated to the first fluid conduit 238. When the solenoid valve 233 is de-energized, the air supply circuit 240 is not in fluid communication with the first fluid conduit 238 via the control valve assembly 232 and the first fluid conduit 238 is in fluid communication with the chamber between the valve assembly system 215 and the control unit housing 214. When the first fluid conduit 238 is in fluid communication with the chamber and if pressurized air is within the first fluid conduit 238, the first fluid conduit 238 and any other portions of the tire pressure management system 210 in fluid communication with the first fluid conduit 238, are vented. The first fluid conduit 238 is vented by directing a flow of pressurized air from the first fluid conduit 238 through the control valve assembly 232 into the chamber 256.

When the solenoid valves 233, 235 are both energized, the air supply circuit 240 is in fluid communication with the first fluid conduit 238 via the supply valve assembly 234 and the control valve assembly 232. When the air supply circuit 240 is in fluid communication with the first fluid conduit 238 via the supply valve assembly 234 and the control valve assembly 232, pressurized air from the air supply circuit 240 can be measured or can be directed to the fluid control circuit 260 via the first fluid conduit 238 to measure, increase, and/or decrease the tire pressure. Measuring, increasing, and/or decreasing the tire pressure is achieved by directing pressurized air from the first fluid conduit 238 to the fluid control circuit 260.

As illustrated in FIG. 14, the first valve cavity 294 of the supply valve assembly 234 is of a generally cylindrical shape. A valve cavity insert 334 is disposed within the first valve cavity 294. In certain embodiments, the valve cavity insert 334 prevents the transfer of pressurized air through the valve cavity 294 from the third port 284. In other embodiments, the valve cavity insert 334 helps to direct the transfer of pressurized air through the valve cavity 294 from the third port 284.

The first valve cavity insert 334 includes one or more annular portions 336 and one or more cylindrical portions 337, 337A. Each annular portion 336 is attached to an adjacent annular portion by a wall portion and each annular portion 336 is attached to one of the cylindrical portions 337, 337A by a wall portion. An aperture (not depicted) is provided through each annular portion 336 to facilitate the movement of pressurized air through the valve cavity 294.

A sealing member 340, 340A is provided around each annular portion 336 and each cylindrical portion 337, 337A. Preferably, each sealing member 340, 340A is disposed in a groove and is ring-shaped. Preferably, each sealing member 340, 340A is formed from an elastomeric material. In an embodiment, each sealing member 340, 340A is an O-ring. Each sealing member 340, 340A provides a seal between one of the annular portions 336 or one of the cylindrical portions 337, 337A and an inner surface of a wall portion 314 which allows the valve cavity insert 294 to be in a sealed relationship with the supply valve housing 274.

As noted above, the supply valve assembly 234 includes the upper chamber portion 316 and the lower chamber portion 332. The upper chamber portion 316 is also selectively in fluid communication with the lower chamber portion 332. The upper chamber portion 316 is in fluid communication with the lower chamber portion 332 when, for example, it is desired to measure, increase, and/or decrease the tire pressure.

The supply valve assembly 234 includes a first biasing member (not depicted). The first biasing member is attached to a first poppet (not depicted). The first poppet is moveable in response to the first biasing member. The first poppet seals against the annular portion 336 of the valve cavity insert 334. The first biasing member moves the first poppet when the first solenoid valve 233 is energized or de-energized. In an embodiment, when a signal from the electronic control portion 216 is received by the solenoid valve 233, the biasing member urges the poppet toward the upper chamber portion 316. In another embodiment, when no signal from the electronic control portion 216 is received by the solenoid valve 233, the biasing member urges the poppet toward the lower chamber portion 332.

When the biasing member urges the poppet towards the upper chamber portion 316, the poppet is in an unsealed relationship with annular portion 336 of the valve cavity insert 334. When the poppet is not in a sealed relationship with the valve cavity insert 334, the upper chamber portion 316 is in fluid communication with the lower chamber portion 332. As noted above, the upper chamber portion 316 is in fluid communication with the lower chamber portion 332 to allow the fluid control circuit 260 to measure, increase, and/or decrease the tire pressure. When the biasing member urges the first poppet toward the lower chamber 332, the poppet is in a sealed relationship the annular portion 336 of the valve cavity insert 334. When the poppet seals against the valve cavity insert 334, the lower chamber portion 332 is not in fluid communication with the air supply circuit 240.

Figure 16:
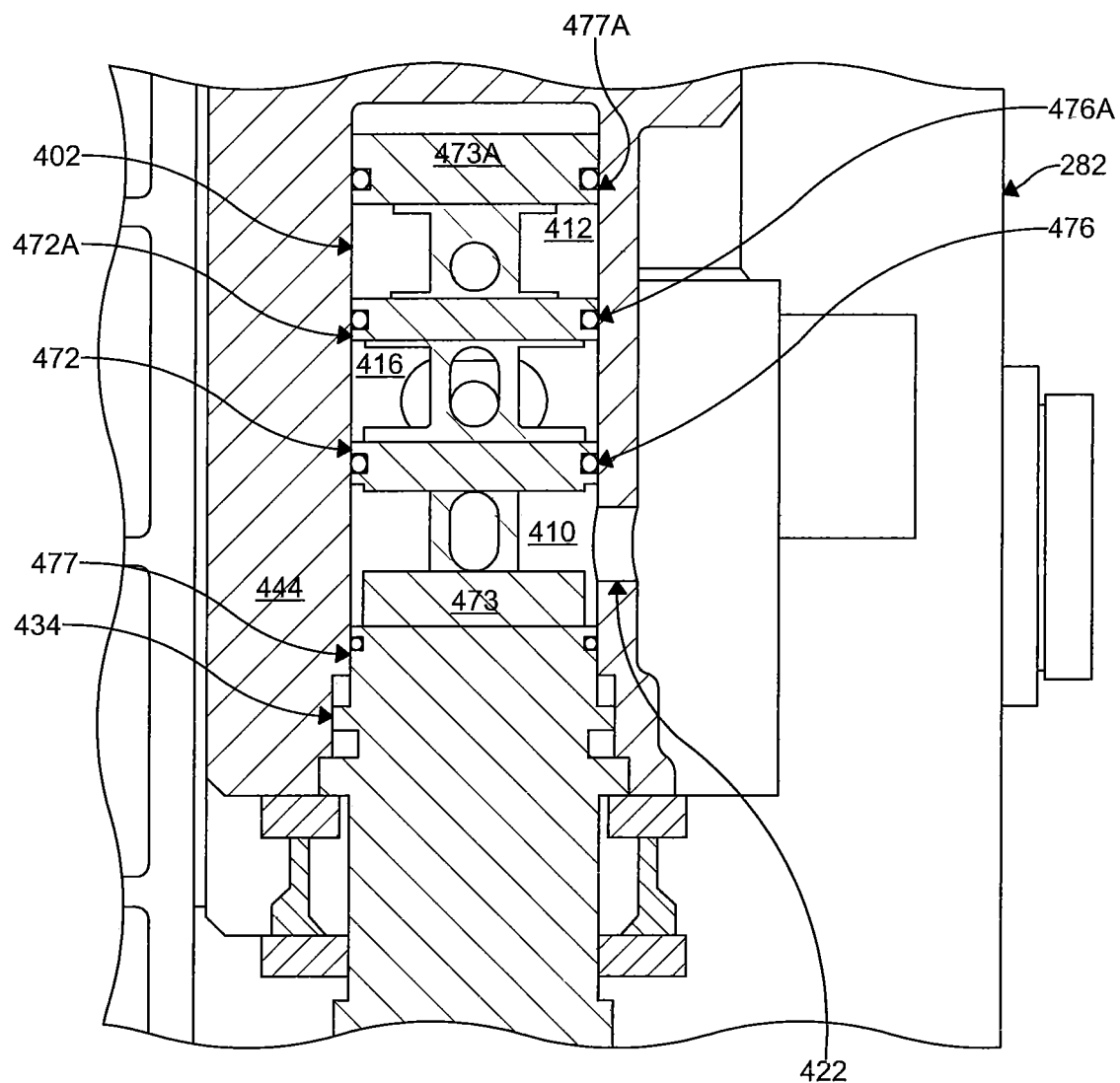
FIG. 16 is a cross-sectional view through a portion of the control valve assembly of FIG. 15 in the control unit of FIG. 9.

Referring now to FIG. 16, the control valve assembly 232 includes a valve cavity 402 is of a generally cylindrical shape. A second valve cavity insert 434 is disposed within the valve cavity 402 to direct pressurized air through the valve cavity 402 and to or from the second fluid opening 418. The valve cavity insert 402 is in a sealed relationship with the control valve housing 374 and partially defines the lower chamber portion 412, the upper chamber portion 410 and the middle chamber portion 416.

The second valve cavity insert 434 includes one or more annular portions 472, 472A and one or more cylindrical portions 473, 473A. Each annular portion 472, 472A is attached to an adjacent annular portion by a wall portion and each annular portion 472, 472A is attached to one of the cylindrical portions 473, 473A by a wall portion. An aperture (not depicted) is provided through each annular portion 472, 472A to facilitate the movement of pressurized air through the valve cavity 402.

A sealing member 476, 476A, 477, 477A is provided around each annular portion 472, 472A and each cylindrical portion 473, 473A. Preferably, each sealing member 476, 476A, 477, 477A is disposed in a groove and is ring-shaped. Preferably, each sealing member 476, 476A, 477, 477A is formed from an elastomeric material. In an embodiment, each sealing member 476, 476A, 477, 477A is an O-ring. Each sealing member 476, 476A, 477, 477A provides a seal between one of the annular portions 472, 472A or one of the cylindrical portions 473, 473A and an inner surface of a wall portion 444 which allows the valve cavity insert 402 to be in a sealed relationship with the control valve housing 374.

As noted above, the control valve assembly 232 also includes the lower chamber portion 412, the upper chamber portion 410, and the middle chamber portion 416. The upper chamber portion 410 is in fluid communication with the chamber formed in the control unit 212 via the third fluid opening 422. The upper chamber portion 410 is also selectively in fluid communication with the middle chamber portion 416. The upper chamber portion 410 is in fluid communication with the middle chamber portion 416 when, for example, it is desired to vent the first fluid conduit 238. Additionally, the upper chamber portion 410 is in fluid communication with the middle chamber portion 416 when, for example, it is desired to decrease the tire pressure. As noted above, the middle chamber portion 416 is in fluid communication with the first fluid conduit 238 via the second fluid opening 418. The lower chamber portion 412 is also selectively in fluid communication with the middle chamber portion 416. The lower chamber portion 412 may be in fluid communication with the middle chamber portion 416 when, for example, it is desired to measure, increase, and/or decrease the tire pressure.

The control valve assembly 232 includes a biasing member (not depicted). The biasing member is attached to a poppet (not depicted). The poppet is moveable in response to the biasing member. The poppet moves between and seals against the annular portions 472, 472A of the valve cavity insert 434. The biasing member is moved and moves the poppet when the solenoid valve 235 is energized or de-energized. In one embodiment, when a signal from the electronic control portion 216 is received by the solenoid valve 235, the biasing member urges the poppet toward the upper chamber portion 210. In another embodiment, when a signal from the electronic control portion 216 is not received by the solenoid valve 235, the biasing member urges the poppet toward the lower chamber portion 412.

When the biasing member urges the poppet toward the upper chamber portion 410, the poppet seals against an annular portion 472 of the valve cavity insert 434. When the poppet seals against the valve cavity insert 434, the lower chamber portion 412 is in fluid communication with the middle chamber portion 416. As noted above, the lower chamber portion 412 is in fluid communication with the middle chamber portion 416 to allow the tire pressure to be measured, increased, and/or decreased. When the biasing member urges the poppet toward the lower chamber portion 412, the poppet seals against another annular portion 472A of the valve cavity insert 434. When the poppet seals against the valve cavity insert 434, the upper chamber portion 410 is in fluid communication with the middle chamber portion 416. As noted above, the upper chamber portion 410 is in fluid communication with the middle chamber portion 416 to allow the first fluid conduit 238 to be vented or the tire pressure to be decreased.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

We claim:

1. A valve assembly system for a tire pressure management system, comprising:
 a supply valve assembly including a supply valve housing having a front outer surface, a rear outer surface, two side outer surfaces, a first opening, a first port, a second port, a third port, and a valve cavity, wherein the first port and the second port are parallel to each other and perpendicular to the first opening and the third port, wherein the third port is perpendicular to the first opening, and wherein at least one of the front outer surface, rear outer surface and two side outer surfaces has a structural support element extending therefrom; and a solenoid valve disposed within the valve cavity, wherein the valve cavity is in fluid communication with a source of pressurized air through the third port and a fluid conduit through the second port;
 a control valve assembly including a control valve housing having a front outer surface, a rear outer surface, two side outer surfaces, a first opening, a first port, a second port and a valve cavity, wherein the first port and second port are parallel to each other and perpendicular to the first opening, and wherein at least one of the front outer surface, rear outer surface and two side outer surfaces has a structural support element extending therefrom; and a solenoid valve disposed within the valve cavity, wherein the valve cavity is in selective fluid communication between the source of pressurized air through the fluid conduit; and
 a connecting module including a first port and a second port in fluid communication with each other, wherein the first port connects to the first port of the supply valve assembly and wherein the second port connects to the second port of the control valve assembly;
 wherein the supply valve assembly is in fluid communication with the control valve assembly via the connecting module extending therebetween.

2. The valve assembly system of claim 1, wherein the connecting module includes an outer surface having at least one structural support element extending therefrom.

3. The valve assembly system of claim 1, wherein the structural support element is one of a plurality of structural support elements, wherein the plurality of structural support elements is ribbing elements.

4. The valve assembly system of claim 1, wherein the control valve assembly further includes a second fluid opening and a third fluid opening in the front outer surface thereof in selective fluid communication with the valve cavity and atmosphere.

5. The valve assembly system of claim 1, wherein the supply valve assembly is of a two-way variety.

6. The valve assembly system of claim 1, wherein the supply valve housing and the structural support element are formed in a unitary manner.

7. The valve assembly system of claim 1, wherein the control valve assembly is of a three-way variety.

8. The valve assembly system of claim 1, wherein the control valve housing and the structural support element are formed in a unitary manner.

9. The valve assembly system of claim 1, further comprising at least one channel valve assembly connected to the second port of the supply valve assembly.

10. The valve assembly system of claim 1, further comprising at least one channel valve assembly connected to the first port of the control valve assembly.

11. A tire pressure management system, comprising:
 the valve assembly system of claim 1;
 at least one channel valve assembly;
 a control unit including a control unit housing and an electronic control portion; and
 at least one wheel assembly including a tire and a wheel rim, wherein the wheel assembly is in selective fluid communication with the at least one channel valve assembly, wherein the control valve assembly is connected to the at least one channel valve assembly, wherein the supply valve assembly is connected to the at least one channel valve assembly, wherein the at least one channel valve assembly, the supply valve assembly, the control valve assembly and the connecting module are located in the control unit housing and in selective fluid communication with the fluid conduit, and wherein at least a portion of a plurality of structural support elements is in direct contact with an inner surface of the control unit housing.

12. The tire pressure management system of claim 11, wherein the control valve assembly further includes a first fluid opening, a second fluid opening, and a third fluid opening, wherein the third fluid opening in the front outer surface thereof in selective fluid communication with the valve cavity and atmosphere via a chamber formed in the control unit between the valve assembly system and the control unit housing.

13. The tire pressure management system of claim 12, wherein the chamber is in fluid communication with the atmosphere via a vent passage.

14. The tire pressure management system of claim 11, wherein the supply valve assembly and the control valve assembly receive one or more signals from the electronic control portion.

15. The tire pressure management system of claim 11, wherein the supply valve assembly is stacked on top of the control channel valve assembly such that the front outer surfaces of the supply valve assembly and the control valve assembly face the same direction and the first openings of the supply valve assembly and the control valve assembly extend in opposite directions.

* * * * *